US012284380B2

(12) United States Patent
Li et al.

(10) Patent No.: US 12,284,380 B2
(45) Date of Patent: Apr. 22, 2025

(54) WEIGHT INDEX INHERITANCE

(71) Applicant: Tencent America LLC, Palo Alto, CA (US)

(72) Inventors: Guichun Li, San Jose, CA (US); Xiang Li, Saratoga, CA (US); Xiaozhong Xu, State College, PA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 0 days.

(21) Appl. No.: 17/837,947

(22) Filed: Jun. 10, 2022

(65) Prior Publication Data

US 2022/0312028 A1    Sep. 29, 2022

Related U.S. Application Data

(63) Continuation of application No. 16/441,879, filed on Jun. 14, 2019, now Pat. No. 11,394,989.
(Continued)

(51) Int. Cl.
*H04N 19/513* (2014.01)
*H04N 19/176* (2014.01)
*H04N 19/96* (2014.01)

(52) U.S. Cl.
CPC ......... *H04N 19/513* (2014.11); *H04N 19/176* (2014.11); *H04N 19/96* (2014.11)

(58) Field of Classification Search
CPC .... H04N 19/513; H04N 19/176; H04N 19/96; H04N 19/105; H04N 19/139;
(Continued)

(56) References Cited

U.S. PATENT DOCUMENTS 6,594,400 B1 *  7/2003  Kim .......................... G06T 5/20
                                                                    382/268
RE41,406 E      6/2010  Kim
                        (Continued)

FOREIGN PATENT DOCUMENTS

JP    2006513592 A    4/2006
JP    2012533212 A    12/2012
                (Continued)

OTHER PUBLICATIONS

Japanese Office Action issued Jul. 26, 2022 in Application No. 2021-524280 with English Translation, pp. 1-28.
(Continued)

*Primary Examiner* — Richard A Hansell, Jr.
(74) *Attorney, Agent, or Firm* — ArentFox Schiff LLP

(57) ABSTRACT

Aspects of the disclosure provide methods and apparatuses for video coding. In some examples, an apparatus includes processing circuitry. The processing circuitry obtains prediction information of a first block in a picture from a coded video bitstream, and generates reconstructed samples of the first block according to the prediction information and one of bi-directional prediction and uni-directional prediction. The processing circuitry adds motion information and a bi-prediction weight index of a History-based Motion Vector Prediction (HMVP) candidate to an HMVP list based on the prediction information of the first block and whether the first block is coded according to the bi-directional prediction or the uni-directional prediction. Further, the processing circuitry generates reconstructed samples of a second block in the picture based on a plurality of candidates that includes the HMVP candidate.

12 Claims, 16 Drawing Sheets

Related U.S. Application Data

(60) Provisional application No. 62/777,593, filed on Dec. 10, 2018.

(58) Field of Classification Search
CPC .... H04N 19/52; H04N 19/577; H04N 19/423; H04N 19/132
See application file for complete search history.

(56) References Cited

U.S. PATENT DOCUMENTS

| | | | |
|---|---|---|---|
| 9,161,057 B2* | 10/2015 | Karczewicz | H04N 19/147 |
| 2010/0086027 A1 | 4/2010 | Panchal et al. | |
| 2011/0007803 A1* | 1/2011 | Karczewicz | H04N 19/105 |
| | | | 375/E7.243 |
| 2013/0077677 A1* | 3/2013 | Wang | H04N 19/58 |
| | | | 375/E7.243 |
| 2013/0128974 A1* | 5/2013 | Chien | H04N 19/17 |
| | | | 375/240.15 |
| 2014/0044170 A1* | 2/2014 | Sato | H04N 19/523 |
| | | | 375/240.12 |
| 2014/0105299 A1* | 4/2014 | Chen | H04N 19/30 |
| | | | 375/240.15 |
| 2015/0208075 A1 | 7/2015 | Eckart et al. | |
| 2017/0094305 A1 | 3/2017 | Li et al. | |
| 2017/0374383 A1* | 12/2017 | Demos | H04N 19/117 |
| 2018/0295385 A1* | 10/2018 | Alshin | H04N 19/159 |
| 2019/0230350 A1* | 7/2019 | Chen | H04N 19/105 |
| 2020/0112741 A1* | 4/2020 | Han | H04N 19/159 |
| 2020/0382795 A1* | 12/2020 | Zhang | H04N 19/186 |
| 2021/0037256 A1* | 2/2021 | Zhang | H04N 19/176 |
| 2021/0337215 A1* | 10/2021 | Zhang | H04N 19/583 |
| 2022/0038720 A1* | 2/2022 | Hashimoto | H04N 19/577 |

FOREIGN PATENT DOCUMENTS

| | | | | |
|---|---|---|---|---|
| KR | 20050019809 A | 3/2005 | | |
| KR | 20120031515 A | 4/2012 | | |
| WO | 2017188779 A | 11/2017 | | |
| WO | WO-2017197146 A1 * | 11/2017 | | H04N 19/105 |
| WO | PCT/CN2018/107178 | 9/2018 | | |
| WO | WO-2020059877 A1 * | 3/2020 | | H04N 19/105 |
| WO | WO-2020085954 A1 * | 4/2020 | | H04N 19/105 |
| WO | WO-2020094051 A1 * | 5/2020 | | H04N 19/105 |

OTHER PUBLICATIONS

Chun-Chi Chen, et.al., Generalized bi-prediction for inter coding, Joint Video Exploration Team (JVET) of ITU-T SG 16 WP 3 and ISO /IEC JTC 1/ SC 29/WG 11 3rd Meeting: Geneva, CH, May 26-Jun. 1, 2016, May 28, 2016, pp. 1-4.

Timofey Solovyev, et.al., Non-CE4: Line buffer size reduction method for generalized bi prediction, Joint Video Experts Team (JVET) of ITU-T SG 16 WP 3 and ISO / IEC JTC 1 / SC 29/WG 11 13th Meeting: Marrakech, MA, Jan. 9-18, 2019, pp. 1-3.

International Search Report and Written Opinion issued Feb. 20, 2020 in PCT/US19/64392.

Bross, Benjamin et al. "Versatile Video Coding (Draft 2)" Joint Video Experts Team (JVET) of ITU-T SG 16 WP 3 and ISO/IEC JTC 1/SC 29/WG 11 11th Meeting: Ljubljana, SI, Jul. 10-18, 2018; Document: JVET-K1001-v7.

Zhang, Li et al. "Suggested specification changes for JVET-L0266" Joint Video Experts Team (JVET) of ITU-T SG 16 WP 3 and ISO/IEC JTC 1/SC 29/WG 11 12th Meeting: Macao, CN, Oct. 3-12, 2018 Document: JVET-L0266-v1.

Chiang, Man-Shu et al. "CE10.1.1: Multi-hypothesis prediction for improving AMVP mode, skip or merge mode, and intra mode" Joint Video Experts Team (JVET) of ITU-T SG 16 WP 3 and ISO/IEC JTC 1/SC 29/WG 11 12th Meeting: Macao, CN, Oct. 3-12, 2018; Document: JVET-L0100-v3.

Appendix of X. Xu, X. Li and S. Liu, "CE8: CPR mode with local search ranges (Test CE8.3.1 and CE8.3.2)", JVET-L0293, 12th JVET meeting, Oct. 2018., Specification changes related to current CTU CPR mode and integer chroma vector.

Bross, Benjamin et al. "Versatile Video Coding (Draft 3)" Joint Video Experts Team (JVET) of ITU-T SG 16 WP 3 and ISO/IEC JTC 1/SC 29/WG 11 12th Meeting: Macao, CN, Oct. 3-12, 2018; Document: JVET-L1001-v4.

High Efficiency Video Coding, Rec. ITU-T H., International Telecommunication Union, 265v4, Dec. 2016.

B. Bross, J. Chen, S. Liu, "Versatile Video Coding (Draft 3)", ISO/IEC JTC1/SC29/WG11 JVET-L1001, Oct. 2018.

L. Zhang, K. Zhang, H. Liu, Y. Wang, P. Zhao, D. Hong, "CE4: History-based Motion Vector Prediction (Test 4.4.7)", ISO/IEC JTC1/SC29/WG11 JVET-L0266, Oct. 2018.

Y.-C. Su, C.-Y. Chen, Y.- W. Huang, S.- M. Lei, Y. He, J. Luo, X. Xiu, Y. Ye, "CE4-related: Generalized bi-prediction Improvements combined from JVET-L0197 and JVET-L0296", ISO/IEC JTC1/SC29/WG11 JVET-L0100, Oct. 2018.

X. Xu, S. Liu, T. Chuang, Y. Huang, S. Lei, K. Rapaka, C. Pang, V. Seregin, Y. Wang, and M. Karczewicz, "Intra Block Copy in HEVC Screen Content Coding Extensions," IEEE J. Emerg. Sel. Topics Circuits Syst., vol. 6, No. 4, pp. 409-419, 2016.

X. Xu, X. Li, G. Li and S. Liu, "CE8-2.2: Current picture referencing using reference index signaling", JVET-K0076, 11th JVET meeting, Jul. 2018.

X. Xu, X. Li and S. Liu, "CE8: CPR mode with local search ranges (Test CE8.3.1 and CE8.3.2)", JVET-L0293, 12th JVET meeting, Oct. 2018.

Extended European Search Report issued Feb. 7, 2022 in Application No. 19895107.1.

Y-C Su et al: "CE4-related: Generalized bi-prediction improvements combined from JVET-L0197 and JVET-L0296", 12. JVET Meeting; Oct. 3, 2018-Oct. 12, 2018; MACAO; (The Joint Video Exploration Team of ISO/IEC JTC1/SC29/WG11 and ITU-T SG.16), No. JVET-L0646, Oct. 8, 2018, XP030251726, Retrieved from the Internet: URL: http://phenix.int-evry.fr/jvet/doc_end_user/documents/12_Macao/wg11/JVET-L0646-v6.zip JVET-L0646-v5.docx [retrieved on Oct. 8, 2018].

Y-C Su et al: "CE4.4.1: Generalized bi-prediction for inter coding", 11. JVET Meeting; Jul. 11, 2018-Jul. 18, 2018; Ljubljana; (The Joint Video Exploration Team of ISO/IEC JTC1/SC29/WG11 and ITU-T Sg. 16), No. JVET-K0248, Jul. 10, 2018, XP030199301, Retrieved from the Internet; URL: http://phenix.int-evry.fr/jvet/ doc_end_user/documents/11_Ljubljana/wg11/JVET-K0248-v2.zip JVET-K0248-v1.docx [retrieved on Jul. 10, 2018].

Li J et al: "Non-CE4: Harmonization between HMVP and GBi", 125. MPEG Meeting; Jan. 14, 2019-Jan. 18, 2019; Marrakech; (Motion Picture Expert Group or ISO/IEC JTC1/SC29/WG11), No. m45530, Jan. 14, 2019, XP030213566, Retrieved from the Internet: URL: http://phenix.int-evry.fr/mpeg/doc_end_user/documents/125_Marrakech/wg11/m45530-JVET-M0264-v2-JVET-M0264.zip, JVET-M0264.docx [retrieved on Jan. 14, 2019].

Korean Office Action issued Apr. 13, 2023 in Application No. 10-2021-7013065 with English Translation, pp. 1-13.

Chinese Office Action issued Sep. 27, 2023 in Application No. 201980063264.2 with English Translation, pp. 1-33.

Benjamin Bross, et al., Versatile Video Coding (Draft 4), Joint Video Experts Team (JVET) of ITU-T SG 16 WP 3 and ISO/IEC JTC 1/SC 29/WG 11 13th Meeting: Marrakech, MA, Jan. 9-18, 2019, Document: JVET-M1001-v7, pp. 1-300.

* cited by examiner

WEIGHT INDEX INHERITANCE

INCORPORATION BY REFERENCE

This present application is a continuation of U.S. Ser. No. 16/441,879, filed on Jun. 14, 2019, which claims the benefit of priority to U.S. Provisional Application No. 62/777,593, "Methods of GBi Index Inheritance and Constraints" filed on Dec. 10, 2018. The disclosures of the prior applications are hereby incorporated by reference in their entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Video coding and decoding can be performed using inter-picture prediction with motion compensation. Uncompressed digital video can include a series of pictures, each picture having a spatial dimension of, for example, 1920× 1080 luminance samples and associated chrominance samples. The series of pictures can have a fixed or variable picture rate (informally also known as frame rate), of, for example 60 pictures per second or 60 Hz. Uncompressed video has significant bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of video coding and decoding can be the reduction of redundancy in the input video signal, through compression. Compression can help reduce the aforementioned bandwidth or storage space requirements, in some cases by two orders of magnitude or more. Both lossless and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described here is a technique henceforth referred to as "spatial merge".

Referring to FIG. 1, a current block (101) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (102 through 106, respectively). In H.265, the MV prediction can use predictors from the same reference picture that the neighboring block is using.

SUMMARY

Aspects of the disclosure provide methods and apparatuses for video encoding/decoding. In some examples, an apparatus includes processing circuitry that obtains prediction information of a first block in a picture from a coded video bitstream and generates reconstructed samples of the first block for output according to one of bi-directional prediction and uni-directional prediction and the prediction information. When a motion information candidate is determined to be stored according to the prediction information of the first block and stored as a History-based Motion Vector Prediction (HMVP) candidate, the processing circuitry stores the motion information candidate that includes at least first motion information and a first weight parameter indicating a first weight for performing the bi-directional prediction for the first block when the first block is coded according to the bi-directional prediction, and stores the first motion information and a default weight parameter indicating a default weight when the first block is coded according to the uni-directional prediction. When a second block in the picture is determined to be decoded based on the motion information candidate, the processing circuitry generates reconstructed samples of the second block for output according to the motion information candidate.

In some embodiments, when the motion information candidate is stored as a regular spatial merge candidate, and the second block is coded according to the bi-directional prediction, the processing circuitry sets a second weight for performing the bi-directional prediction for the second block according to the first weight parameter stored in the motion information candidate when the first block is spatially adjacent to the second block, and sets the second weight for performing the bi-directional prediction for the second block to the default weight when the first block is not spatially adjacent to the second block.

In some embodiments, when the motion information candidate is stored as a candidate that is neither the regular spatial merge candidate nor the HMVP candidate, and the second block is coded according to the bi-directional prediction, the processing circuitry sets the second weight for performing the bi-directional prediction for the second block to the default weight.

In some embodiments, when the first block is in a Coding Tree Unit (CTU) row different from that of a current CTU in which the second block is included, the motion information candidate is stored as a regular merge candidate or an affine merge candidate, and the second block is coded according to the bi-directional prediction, the processing circuitry sets a second weight for performing the bi-directional prediction for the second block to the default weight.

In some embodiments, when the first block is outside a current CTU in which the second block is included, the motion information candidate is stored as a translational merge candidate or an inherited affine merge candidate, and the second block is coded according to the bi-directional prediction, the processing circuitry sets a second weight for performing the bi-directional prediction for the second block to the default weight.

In some embodiments, the first block is coded according to the one of the bi-directional prediction and the uni-directional prediction with the picture as a reference picture.

In some embodiments, the first block is coded according to the bi-directional prediction, and both of the first weight corresponding to a first reference picture in a first list and a second weight derived from the first weight and corresponding to a second reference picture in a second list are positive when the first and second reference pictures are a same reference picture. In some embodiments, one of the first weight corresponding to a first reference picture in a first list and a second weight derived from the first weight and corresponding to a second reference picture in a second list is negative when the first and second reference pictures are different reference pictures.

In some embodiments, the default weight is ½.

In some embodiments, the first block is coded according to the bi-directional prediction, the first weight w1 corresponding to a first reference picture in a first list is determined according to $$w1 = \frac{w}{F},$$

and another weight w0 corresponding to a second reference picture in a second list is determined according to $$w0 = 1 - w1,$$

where w and F are integers, w represents the first weight parameter, and F represents a precision factor. In some embodiments, F is 8.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which.

DETAILED DESCRIPTION OF EMBODIMENTS

Figure 1:
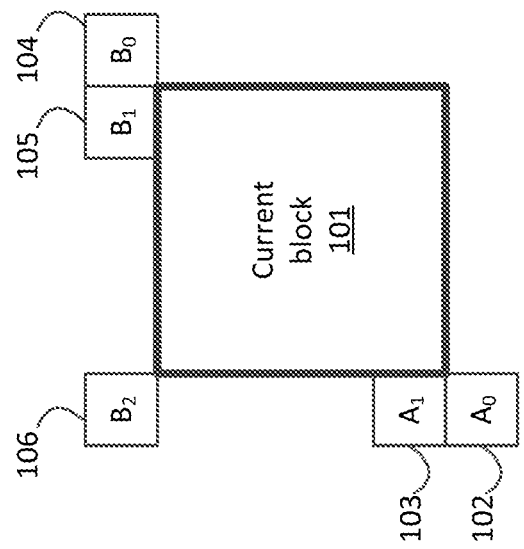
FIG. 1 is a schematic illustration of a current block and its surrounding spatial merge candidates in one example.
Figure 2:
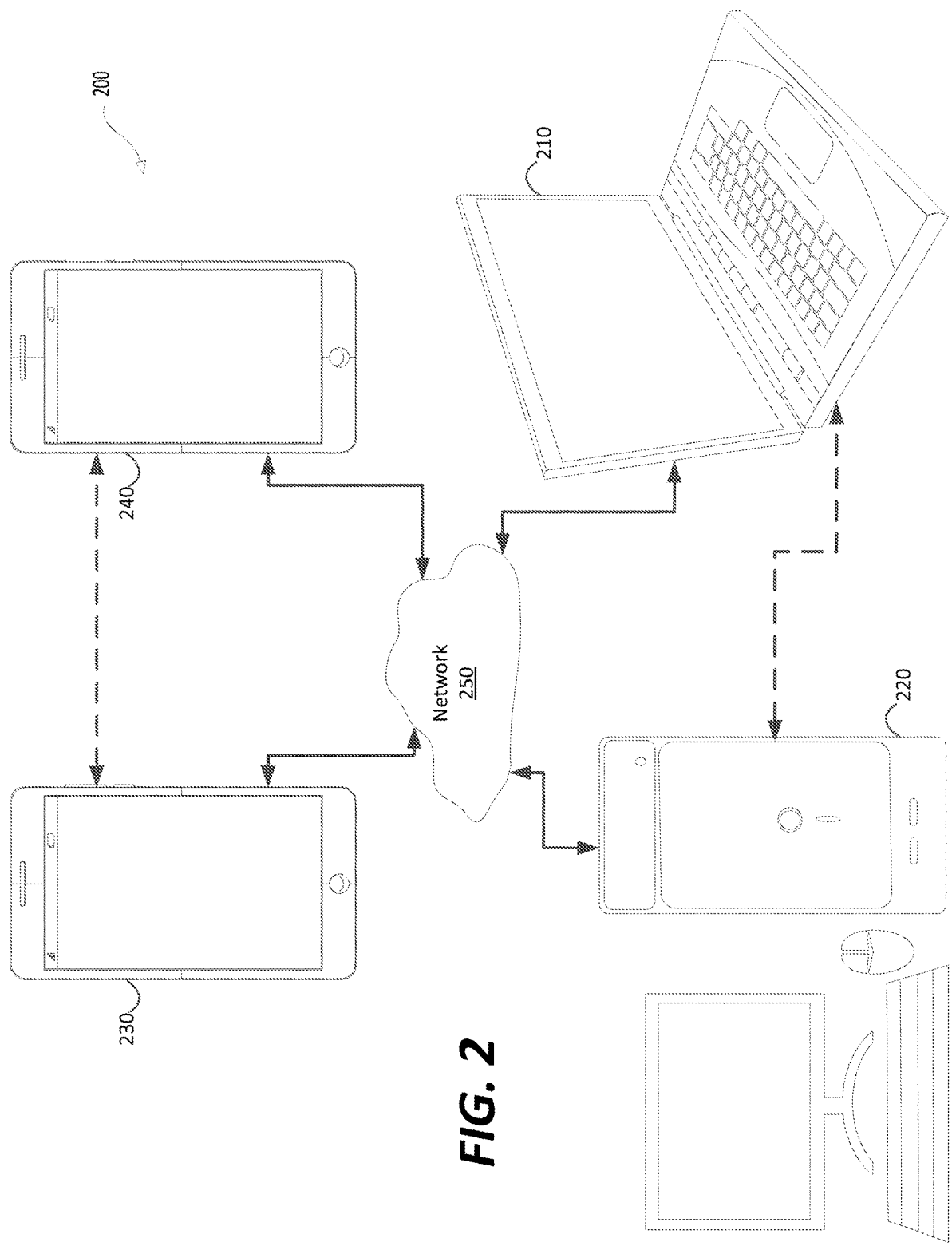
FIG. 2 is a schematic illustration of a simplified block diagram of a communication system (200) in accordance with an embodiment.

FIG. 2 illustrates a simplified block diagram of a communication system (200) according to an embodiment of the present disclosure. The communication system (200) includes a plurality of terminal devices that can communicate with each other, via, for example, a network (250). For example, the communication system (200) includes a first pair of terminal devices (210) and (220) interconnected via the network (250). In the FIG. 2 example, the first pair of terminal devices (210) and (220) performs unidirectional transmission of data. For example, the terminal device (210) may code video data (e.g., a stream of video pictures that are captured by the terminal device (210)) for transmission to the other terminal device (220) via the network (250). The encoded video data can be transmitted in the form of one or more coded video bitstreams. The terminal device (220) may receive the coded video data from the network (250), decode the coded video data to recover the video pictures and display video pictures according to the recovered video data. Unidirectional data transmission may be common in media serving applications and the like.

In another example, the communication system (200) includes a second pair of terminal devices (230) and (240) that performs bidirectional transmission of coded video data that may occur, for example, during videoconferencing. For bidirectional transmission of data, in an example, each terminal device of the terminal devices (230) and (240) may code video data (e.g., a stream of video pictures that are captured by the terminal device) for transmission to the other terminal device of the terminal devices (230) and (240) via the network (250). Each terminal device of the terminal devices (230) and (240) also may receive the coded video data transmitted by the other terminal device of the terminal devices (230) and (240), and may decode the coded video data to recover the video pictures and may display video pictures at an accessible display device according to the recovered video data.

In the FIG. 2 example, the terminal devices (210), (220), (230) and (240) may be illustrated as servers, personal computers, and smart phones, but the principles of the present disclosure may be not so limited. Embodiments of the present disclosure find application with laptop computers, tablet computers, media players, and/or dedicated video conferencing equipment. The network (250) represents any number of networks that convey coded video data among the terminal devices (210), (220), (230), and (240), including for example wireline (wired) and/or wireless communication networks. The communication network (250) may exchange data in circuit-switched and/or packet-switched channels. Representative networks include telecommunications networks, local area networks, wide area networks, and/or the Internet. For the purposes of the present discussion, the architecture and topology of the network (250) may be immaterial to the operation of the present disclosure unless explained herein below.

Figure 3:
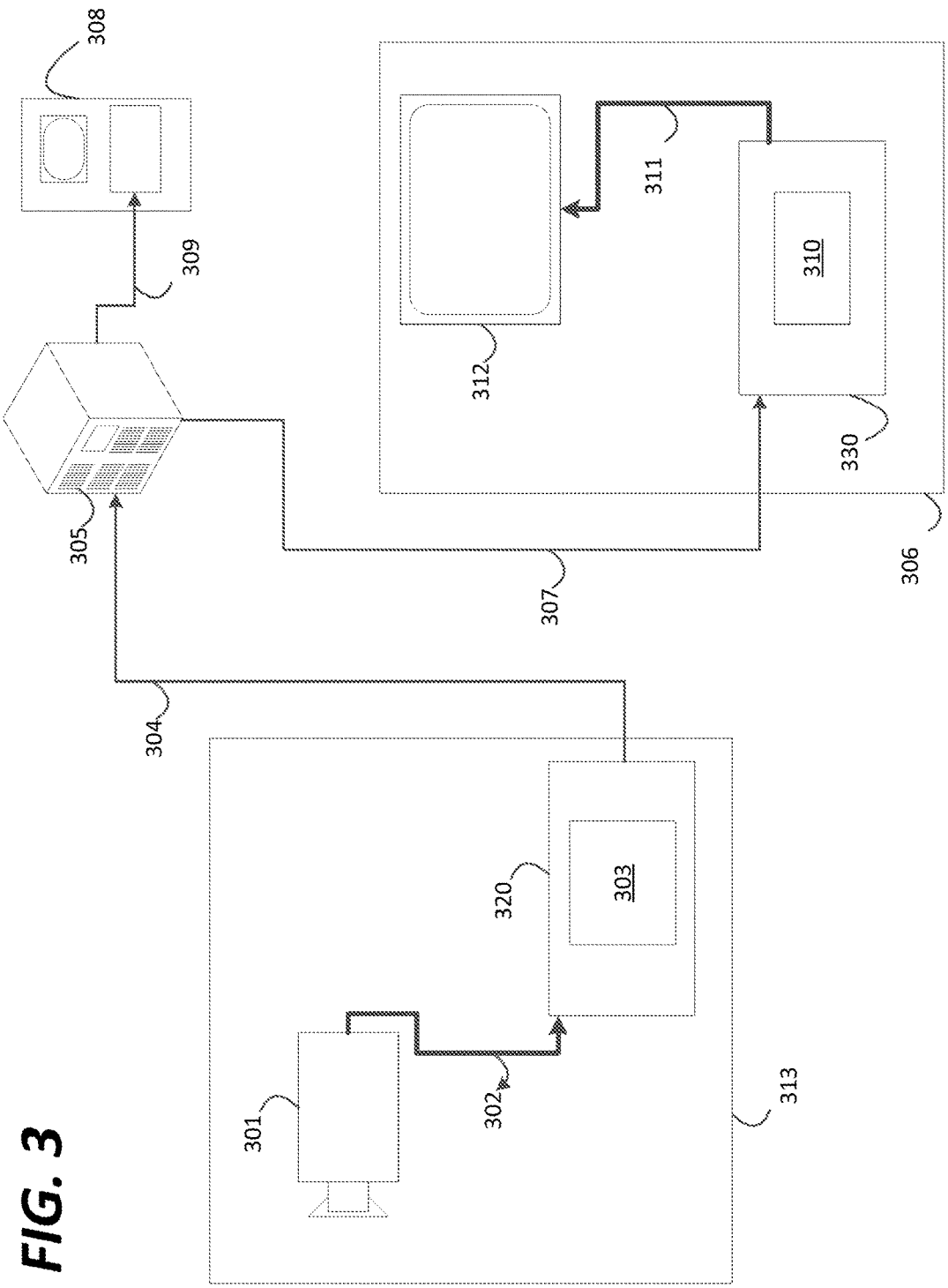
FIG. 3 is a schematic illustration of a simplified block diagram of a communication system (300) in accordance with an embodiment.

FIG. 3 illustrates, as an example for an application for the disclosed subject matter, the placement of a video encoder and a video decoder in a streaming environment. The disclosed subject matter can be equally applicable to other video enabled applications, including, for example, video conferencing, digital TV, storing of compressed video on digital media including CD, DVD, memory stick and the like, and so on.

A streaming system may include a capture subsystem (313), that can include a video source (301), for example a digital camera, creating for example a stream of video pictures (302) that are uncompressed. In an example, the stream of video pictures (302) includes samples that are taken by the digital camera. The stream of video pictures (302), depicted as a bold line to emphasize a high data volume when compared to encoded video data (304) (or coded video bitstreams), can be processed by an electronic device (320) that includes a video encoder (303) coupled to the video source (301). The video encoder (303) can include hardware, software, or a combination thereof to enable or implement aspects of the disclosed subject matter as described in more detail below. The encoded video data (304) (or encoded video bitstream (304)), depicted as a thin line to emphasize the lower data volume when compared to the stream of video pictures (302), can be stored on a streaming server (305) for future use. One or more streaming client subsystems, such as client subsystems (306) and (308) in FIG. 3 can access the streaming server (305) to retrieve copies (307) and (309) of the encoded video data (304). A client subsystem (306) can include a video decoder (310), for example, in an electronic device (330). The video decoder (310) decodes the incoming copy (307) of the encoded video data and creates an outgoing stream of video pictures (311) that can be rendered on a display (312) (e.g., display screen) or other rendering device (not depicted). In some streaming systems, the encoded video data (304), (307), and (309) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (320) and (330) can include other components (not shown). For example, the electronic device (320) can include a video decoder (not shown) and the electronic device (330) can include a video encoder (not shown) as well.

Figure 4:
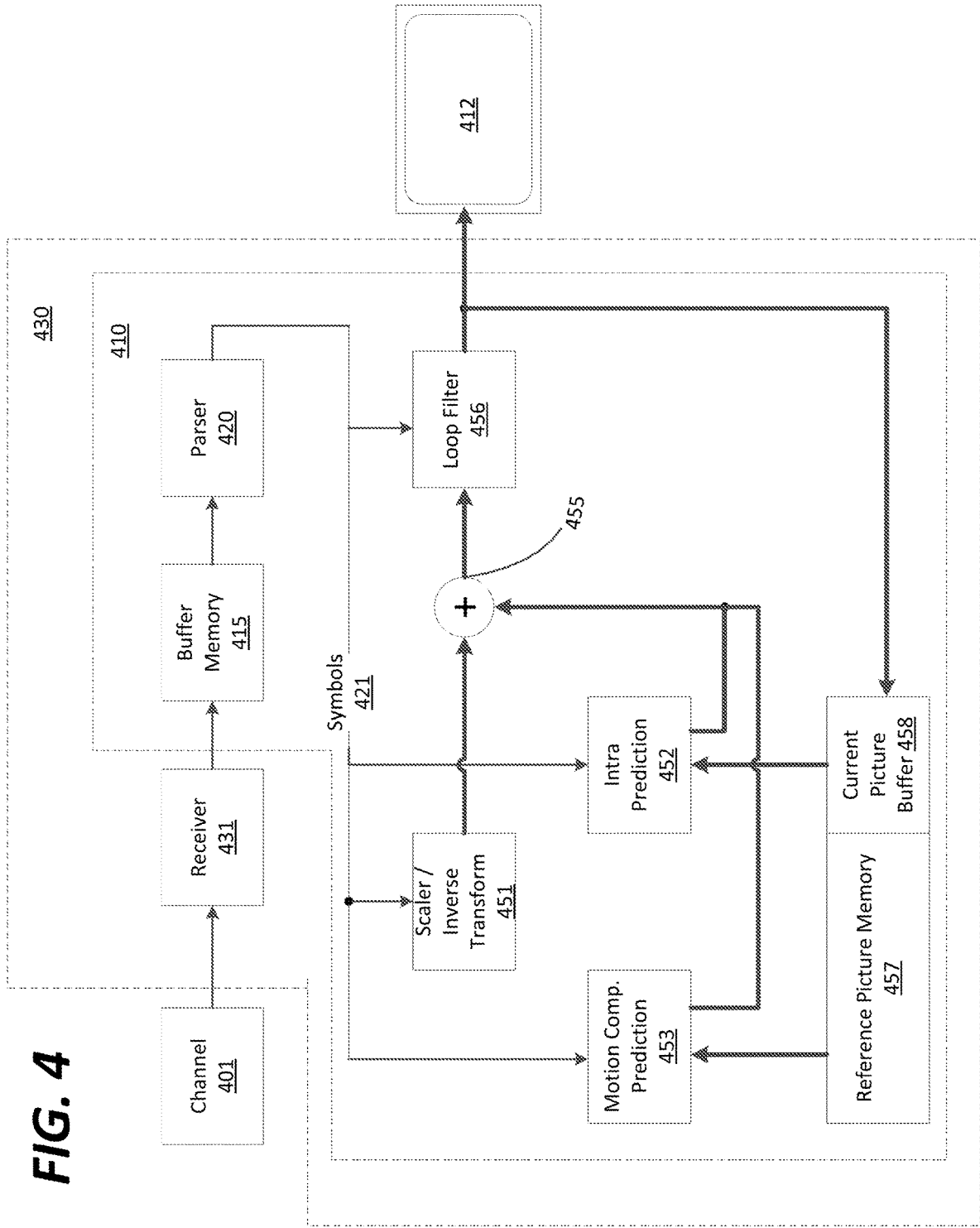
FIG. 4 is a schematic illustration of a simplified block diagram of a decoder in accordance with an embodiment.

FIG. 4 shows a block diagram of a video decoder (410) according to an embodiment of the present disclosure. The video decoder (410) can be included in an electronic device (430). The electronic device (430) can include a receiver (431) (e.g., receiving circuitry). The video decoder (410) can be used in the place of the video decoder (310) in the FIG. 3 example.

The receiver (431) may receive one or more coded video sequences to be decoded by the video decoder (410); in the same or another embodiment, one coded video sequence at a time, where the decoding of each coded video sequence is independent from other coded video sequences. The coded video sequence may be received from a channel (401), which may be a hardware/software link to a storage device which stores the encoded video data. The receiver (431) may receive the encoded video data with other data, for example, coded audio data and/or ancillary data streams, that may be forwarded to their respective using entities (not depicted). The receiver (431) may separate the coded video sequence from the other data. To combat network jitter, a buffer memory (415) may be coupled in between the receiver (431) and an entropy decoder/parser (420) ("parser (420)" henceforth). In certain applications, the buffer memory (415) is part of the video decoder (410). In others, it can be outside of the video decoder (410) (not depicted). In still others, there can be a buffer memory (not depicted) outside of the video decoder (410), for example to combat network jitter, and in addition another buffer memory (415) inside the video decoder (410), for example to handle playout timing. When the receiver (431) is receiving data from a store/forward device of sufficient bandwidth and controllability, or from an isosynchronous network, the buffer memory (415) may not be needed, or can be small. For use on best effort packet networks such as the Internet, the buffer memory (415) may be required, can be comparatively large and can be advantageously of adaptive size, and may at least partially be implemented in an operating system or similar elements (not depicted) outside of the video decoder (410).

The video decoder (410) may include the parser (420) to reconstruct symbols (421) from the coded video sequence. Categories of those symbols include information used to manage operation of the video decoder (410), and potentially information to control a rendering device such as a render device (412) (e.g., a display screen) that is not an integral part of the electronic device (430) but can be coupled to the electronic device (430), as was shown in FIG. 4. The control information for the rendering device(s) may be in the form of Supplemental Enhancement Information (SEI messages) or Video Usability Information (VUI) parameter set fragments (not depicted). The parser (420) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (420) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs), and so forth. The parser (420) may also extract from the coded video sequence information such as transform coefficients, quantizer parameter values, motion vectors, and so forth.

The parser (420) may perform an entropy decoding/parsing operation on the video sequence received from the buffer memory (415), so as to create symbols (421).

Reconstruction of the symbols (421) can involve multiple different units depending on the type of the coded video picture or parts thereof (such as: inter and intra picture, inter and intra block), and other factors. Which units are involved, and how, can be controlled by the subgroup control information that was parsed from the coded video sequence by the parser (420). The flow of such subgroup control information between the parser (420) and the multiple units below is not depicted for clarity.

Beyond the functional blocks already mentioned, the video decoder (410) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (451). The scaler/inverse transform unit (451) receives a quantized transform coefficient as well as control information, including which transform to use, block size, quantization factor, quantization scaling matrices, etc. as symbol(s) (421) from the parser (420). The scaler/inverse transform unit (451) can output blocks comprising sample values, that can be input into aggregator (455).

In some cases, the output samples of the scaler/inverse transform (451) can pertain to an intra coded block; that is: a block that is not using predictive information from previously reconstructed pictures, but can use predictive information from previously reconstructed parts of the current picture. Such predictive information can be provided by an intra picture prediction unit (452). In some cases, the intra picture prediction unit (452) generates a block of the same size and shape of the block under reconstruction, using surrounding already reconstructed information fetched from the current picture buffer (458). The current picture buffer (458) buffers, for example, partly reconstructed current picture and/or fully reconstructed current picture. The aggregator (455), in some cases, adds, on a per sample basis, the prediction information the intra prediction unit (452) has generated to the output sample information as provided by the scaler/inverse transform unit (451).

In other cases, the output samples of the scaler/inverse transform unit (451) can pertain to an inter coded, and potentially motion compensated block. In such a case, a motion compensation prediction unit (453) can access reference picture memory (457) to fetch samples used for prediction. After motion compensating the fetched samples in accordance with the symbols (421) pertaining to the block, these samples can be added by the aggregator (455) to the output of the scaler/inverse transform unit (451) (in this case called the residual samples or residual signal) so as to generate output sample information. The addresses within the reference picture memory (457) from where the motion compensation prediction unit (453) fetches prediction samples can be controlled by motion vectors, available to the motion compensation prediction unit (453) in the form of symbols (421) that can have, for example X, Y, and reference picture components. Motion compensation also can include interpolation of sample values as fetched from the reference picture memory (457) when sub-sample exact motion vectors are in use, motion vector prediction mechanisms, and so forth.

The output samples of the aggregator (455) can be subject to various loop filtering techniques in the loop filter unit (456). Video compression technologies can include in-loop filter technologies that are controlled by parameters included in the coded video sequence (also referred to as coded video bitstream) and made available to the loop filter unit (456) as symbols (421) from the parser (420), but can also be responsive to meta-information obtained during the decoding of previous (in decoding order) parts of the coded picture or coded video sequence, as well as responsive to previously reconstructed and loop-filtered sample values.

The output of the loop filter unit (456) can be a sample stream that can be output to the render device (412) as well as stored in the reference picture memory (457) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (420)), the current picture buffer (458) can become a part of the reference picture memory (457), and a fresh current picture buffer can be reallocated before commencing the reconstruction of the following coded picture.

The video decoder (410) may perform decoding operations according to a predetermined video compression technology in a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (431) may receive additional (redundant) data with the encoded video. The additional data may be included as part of the coded video sequence(s). The additional data may be used by the video decoder (410) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 5:
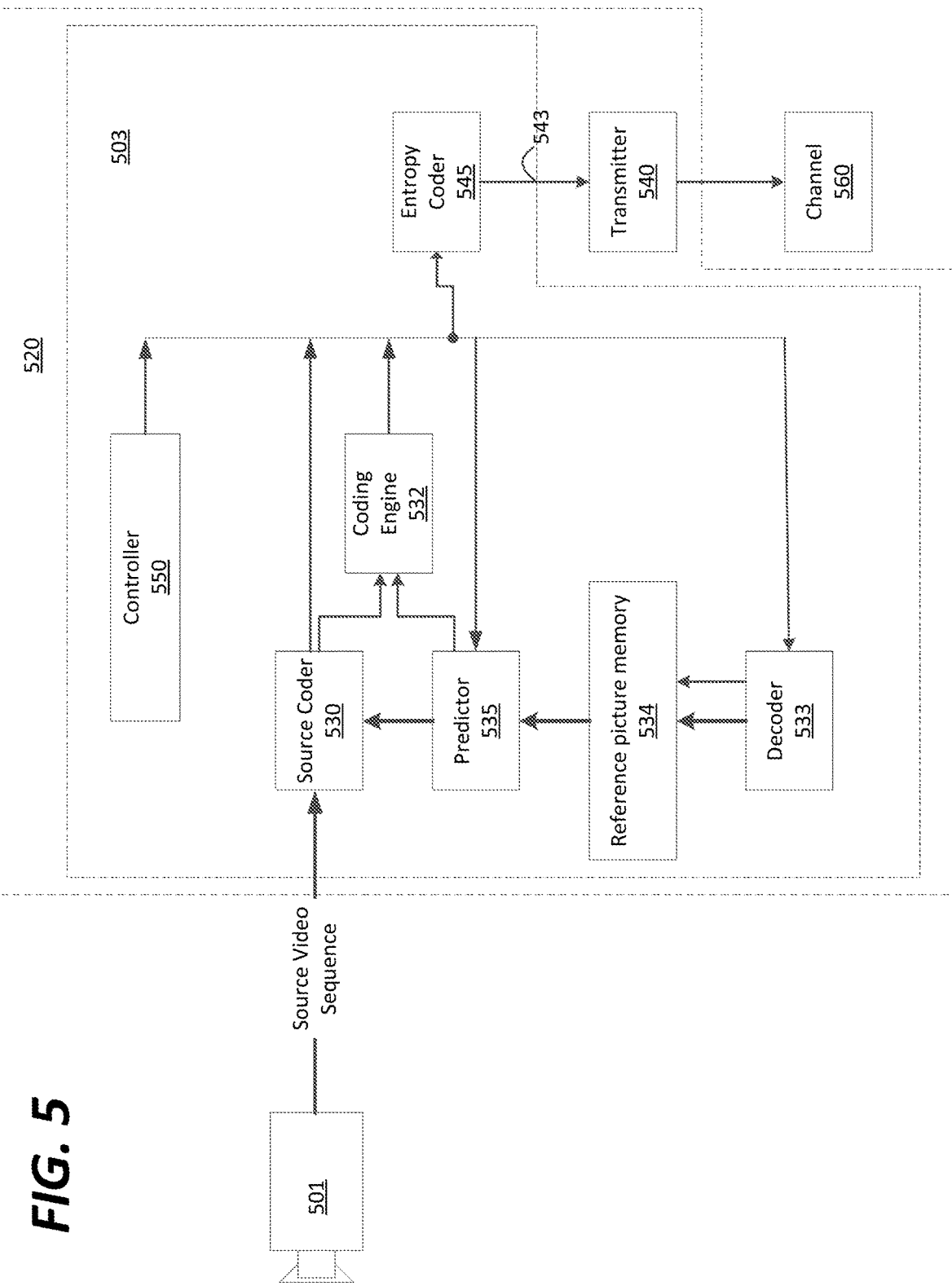
FIG. 5 is a schematic illustration of a simplified block diagram of an encoder in accordance with an embodiment.

FIG. 5 shows a block diagram of a video encoder (503) according to an embodiment of the present disclosure. The video encoder (503) is included in an electronic device (520). The electronic device (520) includes a transmitter (540) (e.g., transmitting circuitry). The video encoder (503) can be used in the place of the video encoder (303) in the FIG. 3 example.

The video encoder (503) may receive video samples from a video source (501) (that is not part of the electronic device (520) in the FIG. 5 example) that may capture video image(s) to be coded by the video encoder (503). In another example, the video source (501) is a part of the electronic device (520).

The video source (501) may provide the source video sequence to be coded by the video encoder (503) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (501) may be a storage device storing previously prepared video. In a videoconferencing system, the video source (501) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (503) may code and compress the pictures of the source video sequence into a coded video sequence (543) in real time or under any other time constraints as required by the application. Enforcing appropriate coding speed is one function of a controller (550). In some embodiments, the controller (550) controls other functional units as described below and is functionally coupled to the other functional units. The coupling is not depicted for clarity. Parameters set by the controller (550) can include rate control related parameters (picture skip, quantizer, lambda value of rate-distortion optimization techniques, . . . ), picture size, group of pictures (GOP) layout, maximum motion vector search range, and so forth. The controller (550) can be configured to have other suitable functions that pertain to the video encoder (503) optimized for a certain system design.

In some embodiments, the video encoder (503) is configured to operate in a coding loop. As an oversimplified description, in an example, the coding loop can include a source coder (530) (e.g., responsible for creating symbols, such as a symbol stream, based on an input picture to be coded, and a reference picture(s)), and a (local) decoder (533) embedded in the video encoder (503). The decoder (533) reconstructs the symbols to create the sample data in a similar manner as a (remote) decoder also would create (as any compression between symbols and coded video bitstream is lossless in the video compression technologies considered in the disclosed subject matter). The reconstructed sample stream (sample data) is input to the reference picture memory (534). As the decoding of a symbol stream leads to bit-exact results independent of decoder location (local or remote), the content in the reference picture memory (534) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (533) can be the same as of a "remote" decoder, such as the video decoder (410), which has already been described in detail above in conjunction with FIG. 4. Briefly referring also to FIG. 4, however, as symbols are available and encoding/decoding of symbols to a coded video sequence by an entropy coder (545) and the parser (420) can be lossless, the entropy decoding parts of the video decoder (410), including the buffer memory (415), and parser (420) may not be fully implemented in the local decoder (533).

An observation that can be made at this point is that any decoder technology except the parsing/entropy decoding that is present in a decoder also necessarily needs to be present, in substantially identical functional form, in a corresponding encoder. For this reason, the disclosed subject matter focuses on decoder operation. The description of encoder technologies can be abbreviated as they are the inverse of the comprehensively described decoder technologies. Only in certain areas a more detail description is required and provided below.

During operation, in some examples, the source coder (530) may perform motion compensated predictive coding, which codes an input picture predictively with reference to one or more previously-coded picture from the video sequence that were designated as "reference pictures". In this manner, the coding engine (532) codes differences between pixel blocks of an input picture and pixel blocks of reference picture(s) that may be selected as prediction reference(s) to the input picture.

The local video decoder (533) may decode coded video data of pictures that may be designated as reference pictures, based on symbols created by the source coder (530). Operations of the coding engine (532) may advantageously be lossy processes. When the coded video data may be decoded at a video decoder (not shown in FIG. 5), the reconstructed video sequence typically may be a replica of the source video sequence with some errors. The local video decoder (533) replicates decoding processes that may be performed by the video decoder on reference pictures and may cause reconstructed reference pictures to be stored in the reference picture cache (534). In this manner, the video encoder (503) may store copies of reconstructed reference pictures locally that have common content as the reconstructed reference pictures that will be obtained by a far-end video decoder (absent transmission errors).

The predictor (535) may perform prediction searches for the coding engine (532). That is, for a new picture to be coded, the predictor (535) may search the reference picture memory (534) for sample data (as candidate reference pixel blocks) or certain metadata such as reference picture motion vectors, block shapes, and so on, that may serve as an appropriate prediction reference for the new pictures. The predictor (535) may operate on a sample block-by-pixel block basis to find appropriate prediction references. In some cases, as determined by search results obtained by the predictor (535), an input picture may have prediction references drawn from multiple reference pictures stored in the reference picture memory (534).

The controller (550) may manage coding operations of the source coder (530), including, for example, setting of parameters and subgroup parameters used for encoding the video data.

Output of all aforementioned functional units may be subjected to entropy coding in the entropy coder (545). The entropy coder (545) translates the symbols as generated by the various functional units into a coded video sequence, by losslessly compressing the symbols according to technologies such as Huffman coding, variable length coding, arithmetic coding, and so forth.

The transmitter (540) may buffer the coded video sequence(s) as created by the entropy coder (545) to prepare for transmission via a communication channel (560), which may be a hardware/software link to a storage device which would store the encoded video data. The transmitter (540) may merge coded video data from the video coder (503) with other data to be transmitted, for example, coded audio data and/or ancillary data streams (sources not shown).

The controller (550) may manage operation of the video encoder (503). During coding, the controller (550) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (503) may perform coding operations according to a predetermined video coding technology or standard, such as ITU-T Rec. H.265. In its operation, the video encoder (503) may perform various compression operations, including predictive coding operations that exploit temporal and spatial redundancies in the input video sequence. The coded video data, therefore, may conform to a syntax specified by the video coding technology or standard being used.

In an embodiment, the transmitter (540) may transmit additional data with the encoded video. The source coder (530) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16

CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 6:
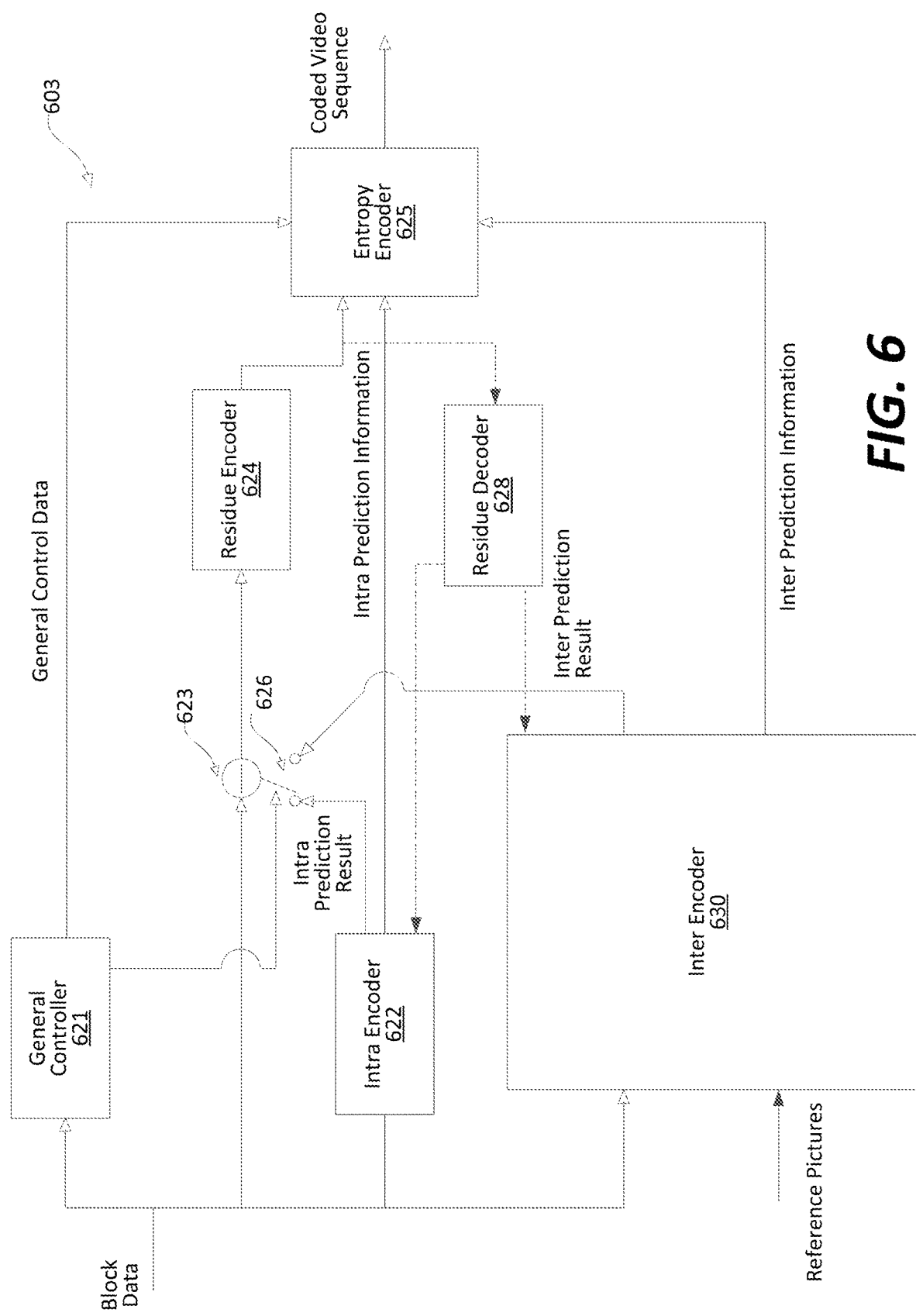
FIG. 6 shows a block diagram of an encoder in accordance with another embodiment.

FIG. 6 shows a diagram of a video encoder (603) according to another embodiment of the disclosure. The video encoder (603) is configured to receive a processing block (e.g., a prediction block) of sample values within a current video picture in a sequence of video pictures, and encode the processing block into a coded picture that is part of a coded video sequence. In an example, the video encoder (603) is used in the place of the video encoder (303) in the FIG. 3 example.

In an HEVC example, the video encoder (603) receives a matrix of sample values for a processing block, such as a prediction block of 8×8 samples, and the like. The video encoder (603) determines whether the processing block is best coded using intra mode, inter mode, or bi-prediction mode using, for example, rate-distortion optimization. When the processing block is to be coded in intra mode, the video encoder (603) may use an intra prediction technique to encode the processing block into the coded picture; and when the processing block is to be coded in inter mode or bi-prediction mode, the video encoder (603) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (603) includes other components, such as a mode decision module (not shown) to determine the mode of the processing blocks.

In the FIG. 6 example, the video encoder (603) includes the inter encoder (630), an intra encoder (622), a residue calculator (623), a switch (626), a residue encoder (624), a general controller (621), and an entropy encoder (625) coupled together as shown in FIG. 6.

The inter encoder (630) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (622) is configured to receive the samples of the current block (e.g., a processing block), in some cases compare the block to blocks already coded in the same picture, generate quantized coefficients after transform, and in some cases also intra prediction information (e.g., an intra prediction direction information according to one or more intra encoding techniques). In an example, the intra encoder (622) also calculates intra prediction results (e.g., predicted block) based on the intra prediction information and reference blocks in the same picture.

The general controller (621) is configured to determine general control data and control other components of the video encoder (603) based on the general control data. In an example, the general controller (621) determines the mode of the block, and provides a control signal to the switch (626) based on the mode. For example, when the mode is the intra mode, the general controller (621) controls the switch (626) to select the intra mode result for use by the residue calculator (623), and controls the entropy encoder (625) to select the intra prediction information and include the intra prediction information in the bitstream; and when the mode is the inter mode, the general controller (621) controls the switch (626) to select the inter prediction result for use by the residue calculator (623), and controls the entropy encoder (625) to select the inter prediction information and include the inter prediction information in the bitstream.

The residue calculator (623) is configured to calculate a difference (residue data) between the received block and prediction results selected from the intra encoder (622) or the inter encoder (630). The residue encoder (624) is configured to operate based on the residue data to encode the residue data to generate the transform coefficients. In an example, the residue encoder (624) is configured to convert the residue data from a spatial domain to a frequency domain, and generate the transform coefficients. The transform coefficients are then subject to quantization processing to obtain quantized transform coefficients. In various embodiments, the video encoder (603) also includes a residue decoder (628). The residue decoder (628) is configured to perform inverse-transform, and generate the decoded residue data. The decoded residue data can be suitably used by the intra encoder (622) and the inter encoder (630). For example, the inter encoder (630) can generate decoded blocks based on the decoded residue data and inter prediction information, and the intra encoder (622) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (625) is configured to format the bitstream to include the encoded block. The entropy encoder (625) is configured to include various information according to a suitable standard, such as the HEVC standard. In an example, the entropy encoder (625) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 7:
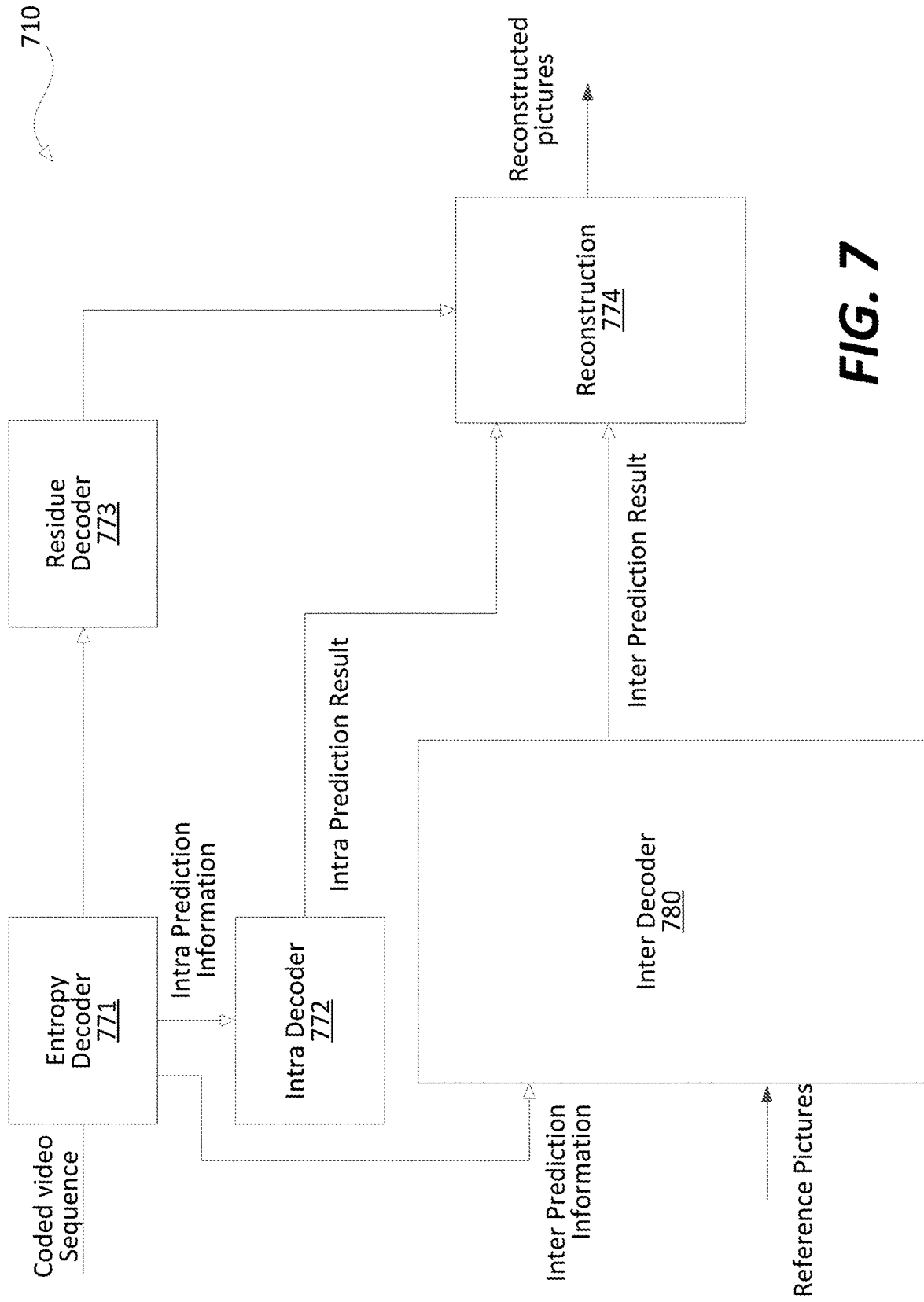
FIG. 7 shows a block diagram of a decoder in accordance with another embodiment.

FIG. 7 shows a diagram of a video decoder (710) according to another embodiment of the disclosure. The video decoder (710) is configured to receive coded pictures that are part of a coded video sequence, and decode the coded pictures to generate reconstructed pictures. In an example, the video decoder (710) is used in the place of the video decoder (310) in the FIG. 3 example.

In the FIG. 7 example, the video decoder (710) includes an entropy decoder (771), an inter decoder (780), a residue decoder (773), a reconstruction module (774), and an intra decoder (772) coupled together as shown in FIG. 7.

The entropy decoder (771) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode), prediction information (such as, for example, intra prediction information or inter prediction information) that can identify certain sample or metadata that is used for prediction by the intra decoder (772) or the inter decoder (780), respectively, residual information in the form of, for example, quantized transform coefficients, and the like. In an example, when the prediction mode is inter or bi-predicted mode, the inter prediction information is provided to the inter decoder (780); and when the prediction type is the intra prediction type, the intra prediction information is provided to the intra decoder (772). The residual information can be subject to inverse quantization and is provided to the residue decoder (773).

The inter decoder (780) is configured to receive the inter prediction information, and generate inter prediction results based on the inter prediction information.

The intra decoder (772) is configured to receive the intra prediction information, and generate prediction results based on the intra prediction information.

The residue decoder (773) is configured to perform inverse quantization to extract de-quantized transform coefficients, and process the de-quantized transform coefficients to convert the residual from the frequency domain to the spatial domain. The residue decoder (773) may also require certain control information (to include the Quantizer Parameter (QP)), and that information may be provided by the entropy decoder (771) (data path not depicted as this may be low volume control information only).

The reconstruction module (774) is configured to combine, in the spatial domain, the residual as output by the residue decoder (773) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (303), (503), and (603), and the video decoders (310), (410), and (710) can be implemented using any suitable technique. In an embodiment, the video encoders (303), (503), and (603), and the video decoders (310), (410), and (710) can be implemented using one or more integrated circuits. In another embodiment, the video encoders (303), (503), and (503), and the video decoders (310), (410), and (710) can be implemented using one or more processors that execute software instructions.

Figure 8:
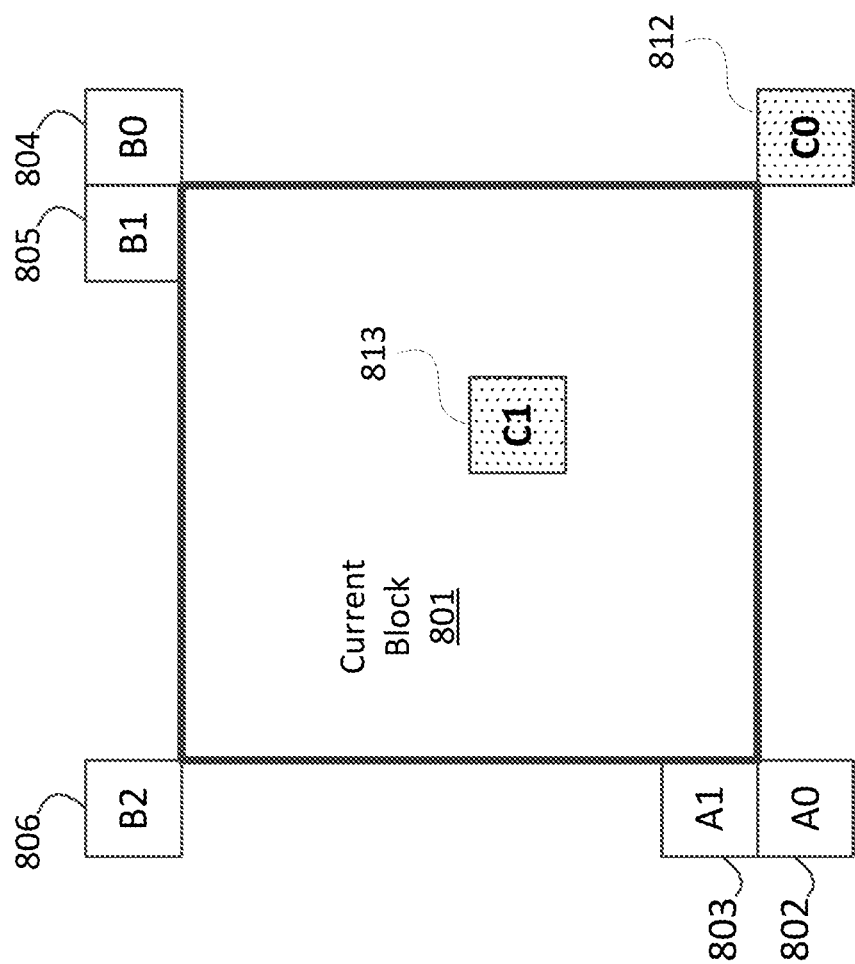
FIG. 8 is a schematic illustration of spatial neighboring blocks and temporal neighboring blocks for a current block in accordance with an embodiment.

FIG. 8 is a schematic illustration of spatial neighboring blocks and temporal neighboring blocks for a current block (801) in accordance with an embodiment. A list of motion information candidates for the current block (801) can be constructed according to a regular merge mode based on motion information of one or more of the spatial neighboring blocks and/or temporal neighboring blocks. A motion information candidate in the list of motion information candidates that is constructed according to the regular merge mode is also referred to in this disclosure as a regular merge candidate.

For example, in HEVC, a merge mode for Inter-picture prediction is introduced. If a merge flag (including skip flag) carried in a coded video bitstream is signaled as true, a merge index can also be signaled to indicate which candidate in a list of motion information candidates constructed using the merge mode (also referred to as a merge candidate list) is to be used to indicate the motion vectors of the current block. At a decoder, the merge candidate list is constructed based on motion information (i.e., candidates) of spatial neighboring blocks and/or temporal neighboring blocks of the current block. Such a merge mode is also referred to as a regular merge mode in this disclosure merely to be distinguishable from the affine merge mode that will be further illustrated with reference to FIG. 9.

Referring to FIG. 8, the motion vector (for uni-directional prediction) or motion vectors (for bi-directional prediction) of a current block (801) can be predicted based on a list of motion information candidates that is constructed using a regular merge mode. The list of motion information candidates can be derived based on motion information of neighboring blocks, such as spatial neighboring blocks denoted A0, A1, B0, B1, and B2 (802 through 806, respectively) and/or temporal neighboring blocks denoted C0 and C1 (812 and 813, respectively). In some examples, spatial neighboring blocks A0, A1, B0, B1, and B2 and the current block (801) belong to a same picture. In some examples, temporal neighboring blocks C0 and C1 belong to a reference picture. Block C0 may correspond to a position outside the current block (801) and adjacent to a lower-right corner of the current block (801), and block C1 may correspond to a position at the lower-right side of, and adjacent to, a center of the block (801).

In some examples, to construct the list of motion information candidates using the regular merge mode, neighboring blocks A1, B1, B0, A0, and B2 are sequentially checked. When any of the checked blocks includes valid motion information (e.g., a valid candidate), the valid candidate can be added to the list of motion information candidates. A pruning operation can be performed to avoid duplicated motion information candidates being included the list.

Temporal neighboring blocks can be checked to add a temporal motion information candidate into the list. The temporal neighboring blocks can be checked after the spatial neighboring blocks. In some examples, the motion information of block C0, if available, is added to the list as a temporal motion information candidate. If block C0 is not coded in inter mode or not available, the motion information of block C1 can be used as the temporal motion information candidate instead.

In some examples, after checking and/or adding spatial and temporal motion information candidates to the list of motion information candidates, a zero motion vector can be added to the list.

Figure 9:
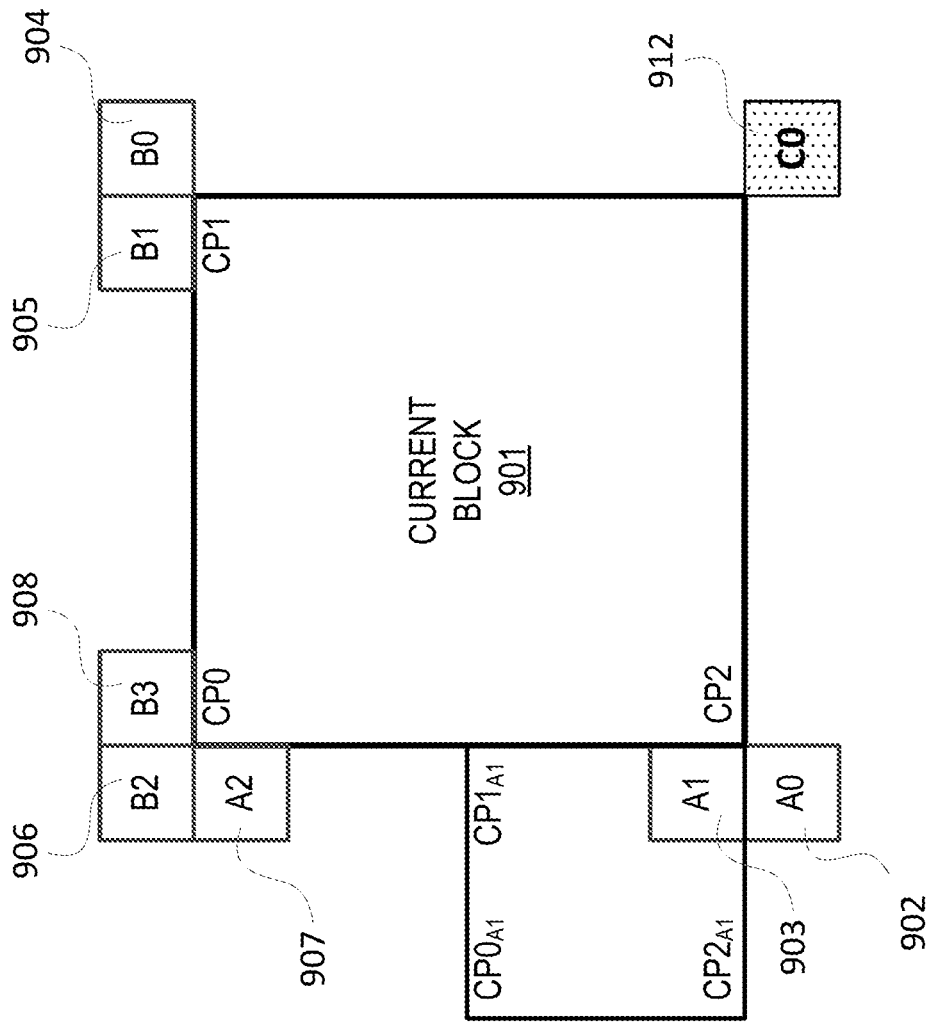
FIG. 9 is a schematic illustration of spatial neighboring blocks and temporal neighboring blocks for a current block in accordance with an embodiment.

FIG. 9 is a schematic illustration of spatial neighboring blocks and temporal neighboring blocks for a current block (901) in accordance with an embodiment. A list of motion information candidates for the current block (901) can be constructed using an affine merge mode based on motion information of one or more of the spatial neighboring blocks and/or temporal neighboring blocks. FIG. 9 shows a current block (901), its spatial neighboring blocks denoted A0, A1, A2, B0, B1, B2, and B3 (902, 903, 907, 904, 905, 906, and 908, respectively), and a temporal neighboring block denoted C0 (912). In some examples, spatial neighboring blocks A0, A1, A2, B0, B1, B2, and B3 and the current block (901) belong to a same picture. In some examples, temporal neighboring block C0 belongs to a reference picture and corresponds to a position outside the current block (901) and adjacent to a lower-right corner of the current block (901).

In some examples, a motion vector of the current block (901) and/or sub-blocks of the current block can be derived using an affine model (e.g., a 6-parameter affine model or a 4-parameter affine model). In some examples, an affine model has 6 parameters (e.g., a 6-parameter affine model) to describe the motion vector of a block. In an example, the 6 parameters of an affine coded block can be represented by three motion vectors (also referred to as three control point motion vectors) at three different locations of the block (e.g., control points CP0, CP1, and CP2 at upper-left, upper-right, and lower-left corners in FIG. 9). In another example, a simplified affine model uses four parameters to describe the motion information of an affine coded block, which can be represented by two motion vectors (also referred to as two control point motion vectors) at two different locations of the block (e.g., control points CP0 and CP1 at upper-left and upper-right corners in FIG. 9).

A list of motion information candidates can be constructed using an affine merge mode (also referred to as an affine merge candidate list). A motion information candidate in the list of motion information candidates that is constructed according to the affine merge mode is also referred to in this disclosure as an affine merge candidate. In some examples, the affine merge mode can be applied when a current block has a width and height that are equal to or greater than 8 samples. According to the affine merge mode, the control point motion vectors (CPMVs) of the current block can be generated based on the motion information of the spatial neighboring blocks. In some examples, the list of motion information candidates can include up to five CPMV candidates, and an index can be signaled to indicate which CPMV candidate is to be used for the current block.

In some embodiments, the affine merge candidate list can have three types of CPVM candidates, including inherited affine candidates, constructed affine candidates, and a zero MV. An inherited affine candidate can be derived by extrapolation from the CPMVs of the neighboring blocks. A constructed affine candidate can be derived using the translational MVs of the neighboring blocks.

In a VTM example, there can be at most two inherited affine candidates, which are derived from corresponding affine motion models of the neighboring blocks, including one block from left neighboring blocks (A0 and A1) and one from upper neighboring blocks (B0, B1, and B2). For the candidate from the left, neighboring blocks A0 and A1 can be sequentially checked, and a first available inherited affine candidate from neighboring blocks A0 and A1 is used as the inherited affine candidate from the left. For the candidate from the top, neighboring blocks B0, B1, and B2 can be sequentially checked, and a first available inherited affine candidate from neighboring blocks B0, B1, and B2 is used as the inherited affine candidate from the top. In some examples, no pruning check is performed between the two inherited affine candidates.

When a neighboring affine block is identified, a corresponding inherited affine candidate to be added to the affine merge list of the current CU can be derived from the control point motion vectors of the neighboring affine block. In the FIG. 9 example, if the neighboring block A1 is coded according to the affine mode, the motion vectors of the upper-left corner (control point $CP0_{A1}$), the upper-right corner (control point $CP1_{A1}$), and the lower-left corner (control point $CP2_{A1}$) of block A1 can be obtained. When block A1 is coded using a 4-parameter affine model, the two CPMVs as an inherited affine candidate of the current block (901) can be calculated according to the motion vectors of control point $CP0_{A1}$ and control point $CP1_{A1}$. When block A1 is coded using a 6-parameter affine model, the three CPMVs as an inherited affine candidate of the current block (901) can be calculated according to the motion vectors of control point $CP0_{A1}$, control point $CP1_{A1}$, and control point $CP2_{A1}$.

Moreover, a constructed affine candidate can be derived by combining the neighboring translational motion information of each control point. The motion information for the control points CP0, CP1, and CP2 is derived from the specified spatial neighboring blocks A0, A1, A2, B0, B1, B2, and B3.

For example, $CPMV_k$ (k=1, 2, 3, 4) represents the motion vector of the k-th control point, where $CPMV_1$ corresponds to control point CP0, $CPMV_2$ corresponds to control point CP1, $CPMV_3$ corresponds to control point CP2, and $CPMV_4$ corresponds to a temporal control point based on temporal neighboring block C0. For $CPMV_1$, neighboring blocks B2, B3, and A2 can be sequentially checked, and a first available motion vector from neighboring blocks B2, B3, and A2 is used as $CPMV_1$. For $CPMV_2$, neighboring blocks B1 and B0 can be sequentially checked, and a first available motion vector from neighboring blocks B1 and B0 is used as $CPMV_2$. For $CPMV_3$, neighboring blocks A1 and A0 can be sequentially checked, and a first available motion vector from neighboring blocks A1 and A0 is used as $CPMV_3$. Moreover, the motion vector of temporal neighboring block C0 can be used as $CPMV_4$, if available.

After $CPMV_1$, $CPMV_2$, $CPMV_3$, and $CPMV_4$, of four control points CP0, CP1, CP2 and the temporal control point are obtained, an affine merge candidate list can be constructed to include affine merge candidates that are constructed in an order of: $\{CPMV_1, CPMV_2, CPMV_3\}$, $\{CPMV_1, CPMV_2, CPMV_4\}$, $\{CPMV_1, CPMV_3, CPMV_4\}$, $\{CPMV_2, CPMV_3, CPMV_4\}$, $\{CPMV_1, CPMV_2\}$, and $\{CPMV_1, CPMV_3\}$. Any combination of three CPMVs can form a 6-parameter affine merge candidate, and any combination of two CPMVs can form a 4-parameter affine merge candidate. In some examples, in order to avoid a motion scaling process, if the reference indices of a group of control points are different, the corresponding combination of CPMVs can be discarded.

Figure 10A:
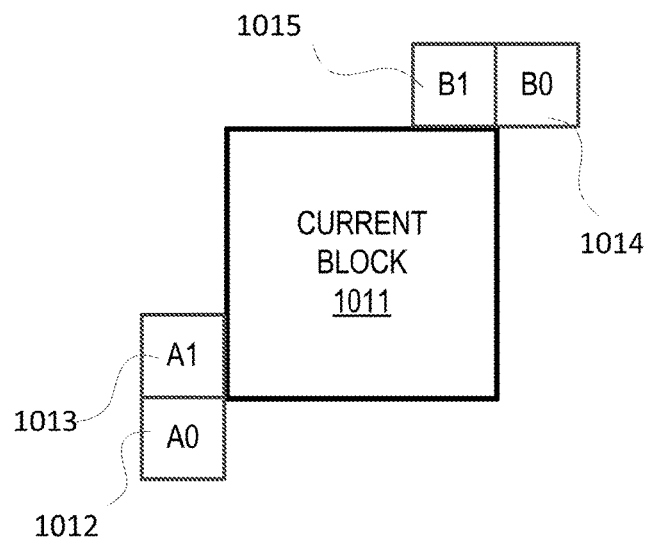
FIG. 10A is a schematic illustration of spatial neighboring blocks that can be used to determine predicting motion information for a current block using a sub-block based temporal MV prediction method based on motion information of the spatial neighboring blocks in accordance with one embodiment.

FIG. 10A is a schematic illustration of spatial neighboring blocks that can be used to determine predicting motion information for a current block (1011) using a sub-block based temporal MV prediction method based on motion information of the spatial neighboring blocks in accordance with one embodiment. FIG. 10A shows a current block (1011) and its spatial neighboring blocks denoted A0, A1, B0, and B1 (1012, 1013, 1014, and 1015, respectively). In some examples, spatial neighboring blocks A0, A1, B0, and B1 and the current block (1011) belong to a same picture.

Figure 10B:
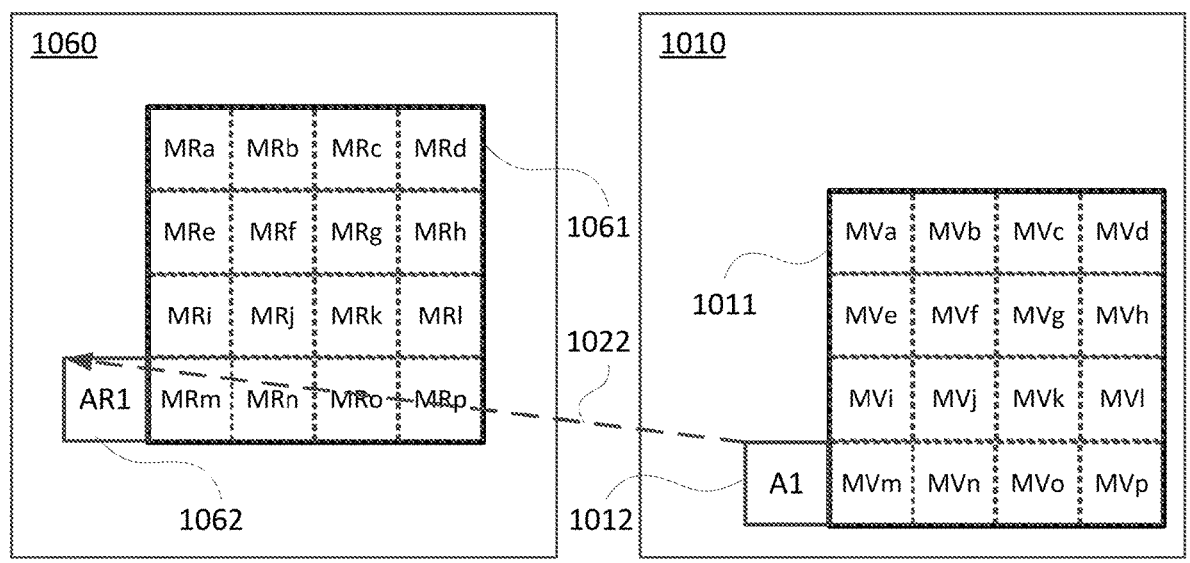
FIG. 10B is a schematic illustration of a selected spatial neighboring block for a sub-block based temporal MV prediction method in accordance with one embodiment.

FIG. 10B is a schematic illustration of determining motion information for sub-blocks of the current block (1011) using the sub-block based temporal MV prediction method based on a selected spatial neighboring block, such as block A1 in this non-limiting example, in accordance with an embodiment. In this example, the current block (1011) is in a current picture (1010), and a reference block (1061) is in a reference picture (1060) and can be identified based on a motion shift (or displacement) between the current block (1011) and the reference block (1061) indicated by a motion vector (1022).

In some embodiments, similar to a temporal motion vector prediction (TMVP) in HEVC, a sub-block based temporal MV prediction (SbTMVP) uses the motion information in various reference sub-blocks in a reference picture for a current block in a current picture. In some embodiments, the same reference picture used by TMVP can be used for SbTVMP. In some embodiments, TMVP predicts motion information at a CU level but SbTMVP predicts motion at a sub-CU level. In some embodiments, TMVP uses the temporal motion vectors from collocated block in the reference picture, which has a corresponding position adjacent to a lower-right corner or a center of a current block, and SbTMVP uses the temporal motion vectors from a reference block, which can be identified by performing a motion shift based on a motion vector from one of the spatial neighboring blocks of the current block.

For example, as shown in FIG. 10A, neighboring blocks A1, B1, B0, and A0 can be sequentially checked in a SbTVMP process. As soon as a first spatial neighboring block that has a motion vector that uses the reference picture (1060) as its reference picture is identified, such as block A1 having the motion vector (1022) that points to a reference block AR1 in the reference picture (1060) for example, this motion vector (1022) can be used for performing the motion shift. If no such motion vector is available from the spatial neighboring blocks A1, B1, B0, and A0, the motion shift is set to (0, 0).

After determining the motion shift, the reference block (1061) can be identified based on a position of the current block (1011) and the determined motion shift. In FIG. 10B, the reference block (1061) can be further divided into 16 sub-blocks with reference motion information MRa through MRp. In some examples, the reference motion information for each sub-block in the reference block (1061) can be determined based on a smallest motion grid that covers a center sample of such sub-block. The motion information can include motion vectors and corresponding reference indices. The current block (1011) can be further divided into 16 sub-blocks, and the motion information MVa through MVp for the sub-blocks in the current block (1011) can be derived from the reference motion information MRa through MRp in a manner similar to the TMVP process, with temporal scaling in some examples.

The sub-block size used in the SbTMVP process can be fixed (or otherwise predetermined) or signaled. In some examples, the sub-block size used in the SbTMVP process can be 8×8 samples. In some examples, the SbTMVP process is only applicable to a block with a width and height equal to or greater than the fixed or signaled size, for example 8 pixels.

In a VTM example, a combined sub-block based merge list which contains a SbTVMP candidate and affine merge candidates is used for the signaling of a sub-block based merge mode. The SbTVMP mode can be enabled or disabled by a sequence parameter set (SPS) flag. In some examples, if the SbTMVP mode is enabled, the SbTMVP candidate is added as the first entry of the list of sub-block based merge candidates, and followed by the affine merge candidates. In some embodiments, the maximum allowed size of the sub-block based merge list is set to five. However, other sizes may be utilized in other embodiments.

In some embodiments, the encoding logic of the additional SbTMVP merge candidate is the same as for the other merge candidates. That is, for each block in a P or B slice, an additional rate-distortion check can be performed to determine whether to use the SbTMVP candidate.

Figure 11A:
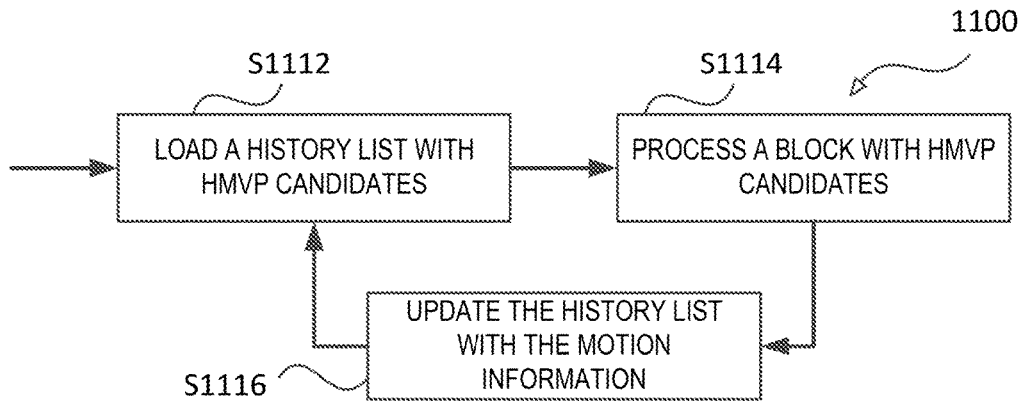
FIG. 11A is a flow chart outlining a process of constructing and updating a list of motion information candidates using a history based MV prediction method in accordance with one embodiment.

FIG. 11A is a flow chart outlining a process (1100) of constructing and updating a list of motion information candidates using a history based MV prediction (HMVP) method in accordance with one embodiment. A motion information candidate in the list of motion information candidates that is constructed according to the HMVP method is also referred to in this disclosure as an HMVP candidate.

In some embodiments, a list of motion information candidates using a HMVP method (also referred to as a history list) can be constructed and updated during an encoding or decoding process. The history list can be emptied when a new slice begins. In some embodiments, whenever there is an inter-coded non-affine block that is just encoded or decoded, the associated motion information can be added to a last entry of the history list as a new HMVP candidate. Therefore, before processing (encoding or decoding) a current block, the history list with HMVP candidates can be loaded (S1112). The current block can be encoded or decoded using the HMVP candidates in the history list (S1114). Afterwards, the history list can be updated using the motion information for encoding or decoding the current block (S1116).

Figure 11B:
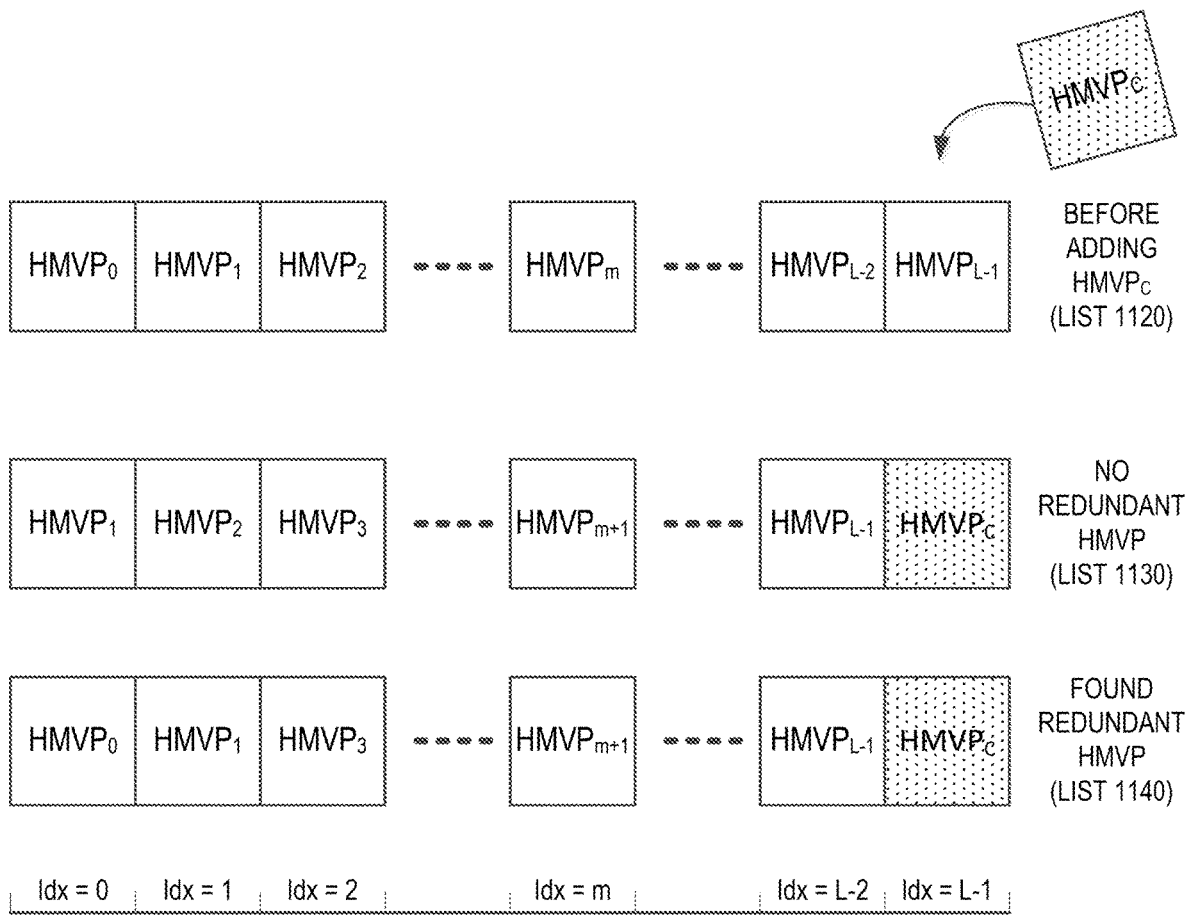
FIG. 11B is a schematic illustration of updating the list of motion information candidates using the history based MV prediction method in accordance with one embodiment.

FIG. 11B is a schematic illustration of updating the list of motion information candidates using the history based MV prediction method in accordance with one embodiment. FIG. 11B shows a history list having a size of L, where each candidate in the list can be identified with an index ranging from 0 to L-1. L is an integer equal to or greater than 0. Before encoding or decoding a current block, the history list (1120) includes L candidates $HMVP_0$, $HMVP_1$, $HMVP_2$, ... $HMVP_m$, ... $HMVP_{L-2}$, and $HMVP_{L-1}$, where m is an integer ranging from 0 to L. After encoding or decoding a current block, a new entry $HMVP_C$ is to be added to the history list.

In a VTM example, the size of the history list can be set to 6, which indicates up to 6 HMVP candidates can be added to the history list. When inserting a new motion candidate (e.g., $HMVP_C$) to the history list, a constrained first-in-first-out (FIFO) rule can be utilized, wherein a redundancy check is first applied to find whether there is a redundant HMVP in the history list. When no redundant HMVP is found, the first HMVP candidate ($HMVP_1$ in FIG. 11B example, with index=0) is removed from the list, and all other HMVP candidates afterwards are moved forward, e.g., with indices reduced by 1. The new $HMVP_C$ candidate can be added to the last entry of the list (with index=L-1 in FIG. 11B for example), as shown in the resulting list (1130). On the other hand, if a redundant HMVP is found (such as $HMVP_2$ in FIG. 11B example), the redundant HMVP in the history list is removed from the list, and all the HMVP candidates afterwards are moved forward, e.g., with indices reduced by 1. The new $HMVP_C$ candidate can be added to the last entry of the list (with index=L-1 in FIG. 11B for example), as shown in the resulting list (1140).

In some examples, the HMVP candidates could be used in the merge candidate list construction process. For example, the latest HMVP candidates in the list can be checked in order and inserted into the candidate list after a TMVP candidate. Pruning can be applied on the HMVP candidates against the spatial or temporal merge candidates, but not the sub-block motion candidates (i.e., SbTMVP candidates) in some embodiments.

In some embodiments, to reduce the number of pruning operations, one or more of the following rules can be followed:
    (a) Number of HMPV candidates to be checked denoted by M is set as follows:

$$M = (N <= 4) ? L : (8-N),$$

wherein N indicates a number of available non-sub block merge candidates, and L indicates number of available HMVP candidates in the history list.

(b) In addition, once the total number of available merge candidates becomes only one less than a signaled maximum number of merge candidates, the merge candidate list construction process from HMVP list can be terminated.

(c) Moreover, the number of pairs for combined bi-predictive merge candidate derivation can be reduced from 12 to 6.

In some embodiments, HMVP candidates can be used in an AMVP candidate list construction process. The motion vectors of the last K HMVP candidates in the history list can be added to an AMVP candidate list after a TMVP candidate. In some examples, only HMVP candidates with the same reference picture as an AMVP target reference picture are to be added to the AMVP candidate list. Pruning can be applied on the HMVP candidates. In some examples, K is set to 4 while the AMVP list size is kept unchanged, e.g., equal to 2.

In some examples, the list of motion information candidates can be constructed by one or more of the various list construction processes described above and/or any other applicable list construction process. After a list of motion information candidates has been constructed, additional averaged reference motion vectors can be determined by pairwise averaging the already determined reference motion information according to a predetermined pairing.

In some examples, there can be at most four reference motion vectors that have been determined to be included in a list of reference motion candidates for coding a current block. These four reference motion vectors may be arranged in the list in association with indices (e.g., 0, 1, 2, and 3) indicating an order of the reference motion vectors in the list. Additional averaged reference motion vectors may be respectively determined based on the pairs defined as {(0, 1), (0, 2), (1, 2), (0, 3), (1, 3), (2, 3)} for example. In some examples, if both reference motion vectors of a predefined pair are available in the list of reference motion vectors, these two reference motion vectors can still be averaged even when they point to different reference pictures.

Moreover, current picture referencing (CPR) is sometimes referred to as intra block copy (IBC), where a motion vector for a current block refers to the already reconstructed samples in the current picture. CPR is supported in HEVC screen content coding extension (HEVC SCC). A CPR-coded block can be signaled as an inter coded block. The luma motion (or block) vector of a CPR-coded block can be provided in integer precision. The chroma motion vector can be clipped to integer precision as well. When combined with AMVR, the CPR mode can switch between 1-pel and 4-pel motion vector precisions. The current picture can be placed at the end of the reference picture list L0. To reduce memory consumption and decoder complexity, the CPR in a VTM example can allow referencing only to the reconstructed portion of the current CTU. This restriction can allow the CPR mode to be implemented using local on-chip memory for hardware implementations.

At the encoder side, a hash-based motion estimation is performed for CPR. The encoder can perform a rate-distortion check for blocks with either a width or height that is no greater than 16 luma samples. For a non-merge mode, the block vector search can be performed using a hash-based search first. If the hash search does not return any valid candidate, a block matching based local search can be performed.

In some examples when performing the hash-based search, a hash key matching (32-bit CRC) between the current block and a reference block can be extended to all allowed block sizes. The hash key calculation for every position in the current picture can be based on 4×4 sub-blocks. For the current block of a larger size, a hash key can be determined to match that of the reference block when all the hash keys of all 4×4 sub-blocks match the hash keys in the corresponding reference locations. In some examples, if the hash keys of multiple reference blocks are found to match that of the current block, the block vector costs of each matched reference are calculated, and the one with the minimum cost can be selected.

In some examples when performing the block matching search, the search range can be set to R samples to the left and on top of the current block within the current CTU. At the beginning of a CTU, the value of R can be initially set to 128 if there is no temporal reference picture, and can be initially set to 64 if there is at least one temporal reference picture. A hash hit ratio can be defined as the percentage of samples in the CTU that have a match using the hash-based search. In some embodiments, while encoding the current CTU, if the hash hit ratio is below 5%, R can be reduced by half.

In some applications, for a block that is reconstructed using a bi-directional prediction, a generalized bi-prediction (GBi) index can be used and included in the motion information for the block. In some examples, a GBi index indicates a first weight applicable to a first reference picture from list-1, and a second weight applicable for a second reference picture from list-0 can be derived from the first weight. In some examples, a GBi index can represent a derived weight parameter w, and the first weight $w_1$ can be determined according to $$w_1 = \frac{w}{F},$$

F represents a precision factor.

Also, the second weight $w_0$ can be determined according to $$w_0 = 1 - w_1.$$

In some examples, when the precision factor F is set to 8 (i.e., with ⅛ sample precision), the bi-prediction $P_{bi\text{-}pred}$ of a current block can be generated according to $$P_{bi\text{-}pred} = ((8-w)*P_0 + w*+P_1+4) >> 3,$$

where $P_0$ and $P_1$ are reference samples from reference pictures in list-0 and list-1, respectively.

In some examples, with the precision factor F set to 8, the GBi index can be assigned to represent one of five weights {−2/8, 3/8, 4/8, 5/8, 10/8} available for a low-delay picture and three weights {3/8, 4/8, 5/8} for a non-low-delay picture. The weight to be signaled using a GBi index can be determined by a rate-distortion cost analysis. In some examples, the weight checking order can be {4/8, −2/8, 10/8, 3/8, 5/8} at the encoder.

In some applications using the advanced motion vector prediction (AMVP) mode, the weight parameter selection can be explicitly signaled using a GBi index at a CU-level if a particular CU is coded by bi-prediction. If bi-prediction is used and the CU area is smaller than 256 luma samples, the GBi index signaling can be disabled.

In some applications, for inter merge mode from spatial candidates and inherited affine merge mode, the weight parameter selection can be inherited from a selected merge candidate based on the GBi index thereof. For other merge types, such as temporal merge candidates, HMVP candidates, SbTMVP candidates, constructed affine merge candidates, pairwise averaged candidates, etc., the weight may be set to represent a default weight (e.g., ½ or ⅜), and the GBi index from a selected candidate is not inherited.

The GBi index inheritance can sometimes be beneficial for some merge modes but not the others, and can sometimes outweighed by the additional memory space required for recording the GBi indices from previously coded blocks. Therefore, in addition to the examples described above, in some embodiments, the GBi index inheritance functionality can be further configured for the application of various scenarios as further described below. The GBi index inheritance configurations as described below can be used separately or combined in any order. In some examples, not all of the following GBi index inheritance configurations are implemented at the same time.

According to a first GBi index inheritance configuration in some examples, the GBi index inheritance can be enabled for HMVP merge candidates. In some embodiments, the GBi index of a bi-predicted coded block can be stored in each entry of the HMVP candidate list. As such, according to the first GBi index inheritance configuration, the management of the HMVP candidates can be harmonized with the management of motion information candidates constructed or obtained according to other modes, such as the regular merge mode.

In one embodiment, when any entry of the HMVP candidate list is being updated, motion information (for example including, MV, reference list, and reference index) and a corresponding GBi index from the coded block can be updated as well. For example, after obtaining prediction information of a block, when a motion information candidate is determined to be stored to the HMVP candidate list according to the prediction information of the block, the motion information candidate can be stored to include at least the motion information of the block and a weight parameter for performing bi-directional prediction for the first block when the first block is coded according to the bi-directional prediction. Also , the motion information candidate can be stored to include at least the motion information of the block and a default weight parameter when the block is coded according to the uni-directional prediction.

When a regular inter merge candidate from the HMVP candidate list is selected in a decoding process as a MV predictor for a current coding block, and the candidate is coded using bi-directional prediction (also referred to as bi-predicted), the current block's GBi index can be set to the value of the GBi index value from the candidate. Otherwise, if the HMVP merge candidate is coded using uni-directional prediction (also referred to as uni-predicted), the current block's GBi index can be set to a default GBi index, which corresponds to the weight of 1/2 in some examples.

According to a second GBi index inheritance configuration in some examples, the GBi index inheritance can be enabled only for spatial inter merge candidates. In some embodiments, the GBi index inheritance can be enabled only for regular spatial inter merge candidates. As such, according to the second GBi index inheritance configuration, the implementation of the GBi index inheritance functionality can be simplified in order to reduce the computational complexity.

In some embodiments, after obtaining prediction information of a block, when a motion information candidate is determined to be stored to the regular merge candidate list according to the prediction information of the block, the motion information candidate can be stored to include at least the motion information of the block and a weight parameter for performing bi-directional prediction for the first block when the first block is coded according to the bi-directional prediction. Also, the motion information candidate can be stored to include at least the motion information of the block and a default weight parameter when the block is coded according to the uni-directional prediction.

In one embodiment, when a spatial merge candidate is selected in the decoding process for the current block, and the candidate is bi-predicted, the current block's GBi index can be set to the GBi index value from the candidate block. Otherwise, if the spatial merge candidate is uni-predicted, the current block's GBi index can be set to a default GBi index, which corresponds to the weight of ½ in some examples. In some examples, if the merge candidate selected for the current block is not a regular spatial merge candidate, such as a temporal merge candidate, affine model inherited candidate, SbTMVP candidate, HMVP candidate, or pairwise averaged candidate, etc., the current block's GBi index can be set to the default GBi index, to reduce memory load for example.

According to a third GBi index inheritance configuration in some examples, the GBi index inheritance can be disabled for regular spatial merge candidates that are from a motion data line buffer. As such, according to the third GBi index inheritance configuration, the computational complexity can be simplified and the memory space for storing motion information candidates can be reduced.

Specifically, when the current block is located at the top row of the current CTU, the spatial merge candidates from positions above the current block may be stored in the motion data line buffer, which is used to store motion information for the last row of allowed minimum size inter blocks at the bottom of CTUs for the previous CTU row.

In one embodiment, the GBi index inheritance for regular spatial merge candidates from motion data line buffer can be disabled to save memory storage of the motion data line buffer. For example, only regular motion information, including motion vector values and reference index values for list 0 and/or list 1 may be saved in the motion data line buffer. The motion data line buffer can avoid storing the GBi index values corresponding to blocks in the previous CTU row. Therefore, in some examples, when the selected spatial merge candidate for the current block is from a block located in a previous CTU row above a CTU boundary, the motion information can be loaded from the motion data line buffer, and the current block's GBi index can be set to a default GBi index, which corresponds to the weight of ½ in some examples.

Figure 12:
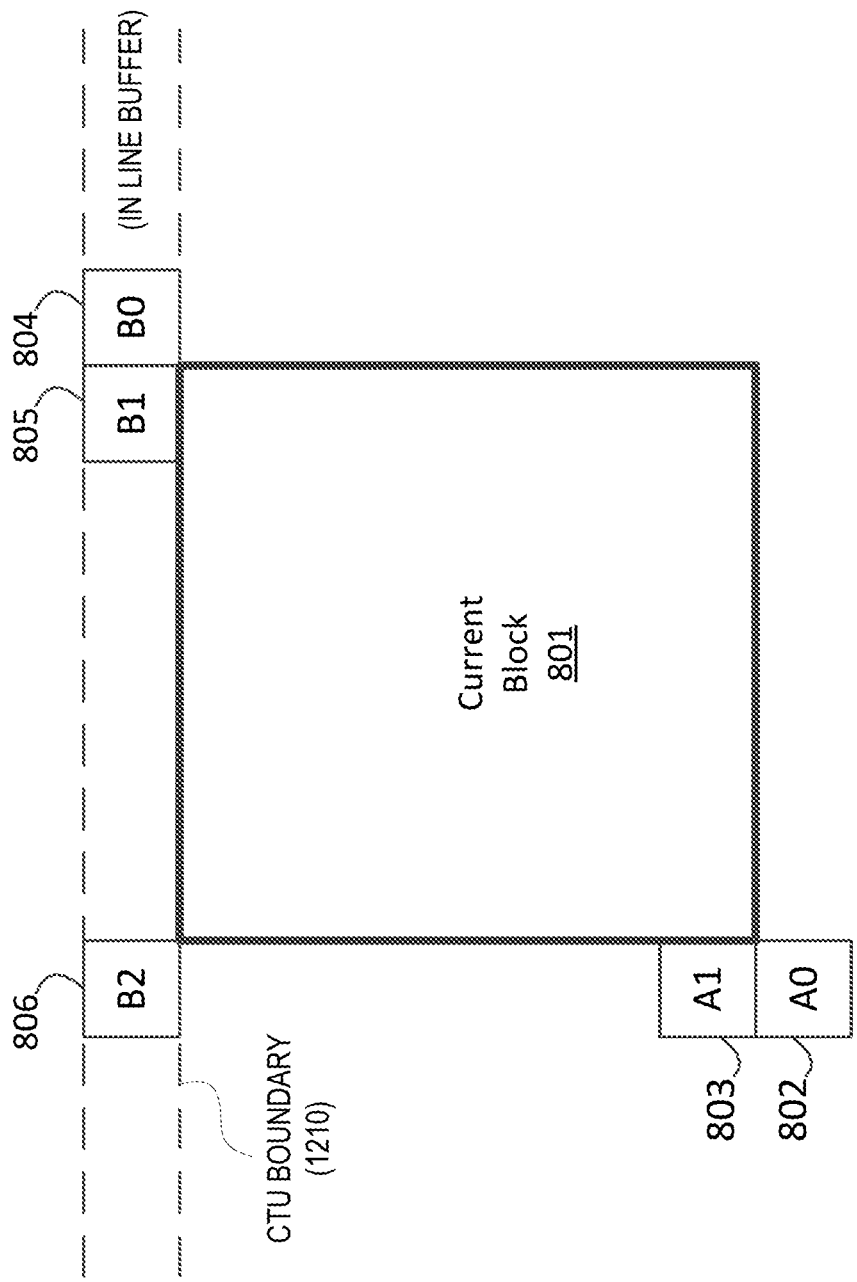
FIG. 12 is a schematic illustration of a current block at a CTU boundary and its spatial neighboring blocks in accordance with one embodiment.

FIG. 12 is a schematic illustration of a current block (801) at a CTU boundary (1210) and its spatial neighboring blocks in accordance with one embodiment. In FIG. 12, components that are the same or similar to those depicted in FIG. 8 are given the same reference numbers or labels, and a detailed description thereof has been presented above with reference to FIG. 8.

For example, as depicted in FIG. 12, for the current block (801), if the selected spatial merge candidate corresponds to a neighboring block B0, B1, or B2, the motion information thereof can be stored in a motion data line buffer. Therefore, according to the third GBi index inheritance configuration in some examples, the GBi index of the current block (801) may be set to the default GBi index without referencing the GBi index value of the selected spatial merge candidate.

According to a fourth GBi index inheritance configuration in some examples, the GBi index inheritance can be disabled for affine merge candidates that are from a motion data line buffer. Specifically, when the current block is located at the top row of the current CTU, the affine motion information of spatial neighboring blocks from positions above the current block for deriving inherited affine merge candidates for the current block may be stored in the motion data line buffer, which is used to store motion information for the last row of allowed minimum size inter blocks at the bottom of CTUs for the previous CTU row.

In one embodiment, the GBi index inheritance for inherited affine merge candidates from motion data line buffer can be disabled to save memory storage of the motion data line buffer. For example, GBi index values may not be saved in the motion data line buffer. When the selected inherited affine merge candidate for the current block is derived from an affine coded block located above the CTU boundary, the affine motion information is loaded from the motion data line buffer. The GBi index of the current block can be set to a default GBi index, which corresponds to the weight of ½ in some examples.

Figure 13:
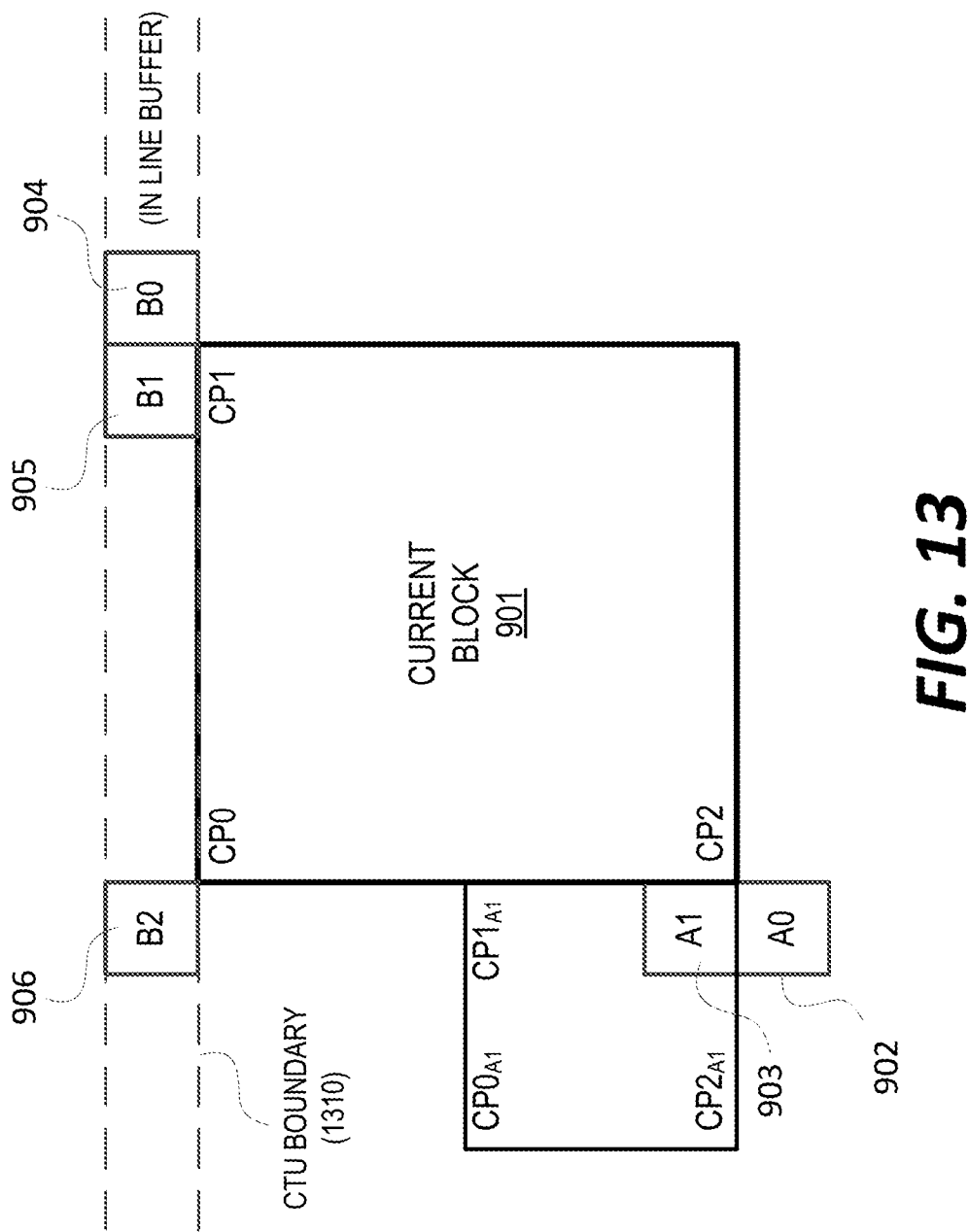
FIG. 13 is a schematic illustration of a current block at a CTU boundary and its spatial affine neighboring blocks in accordance with one embodiment.

FIG. 13 is a schematic illustration of a current block (901) at a CTU boundary (1310) and its spatial affine neighboring blocks in accordance with one embodiment. In FIG. 13, components that are the same or similar to those depicted in FIG. 9 are given the same reference numbers or labels, and a detailed description thereof has been presented above with reference to FIG. 9.

For example, as depicted in FIG. 13, for the current block (901), if the selected inherited affine merge candidate corresponds to a neighboring block B0, B1, or B2, the affine motion information thereof can be stored in a motion data line buffer. Therefore, according to the fourth GBi index inheritance configuration in some examples, the GBi index of the current block (901) may be set to the default GBi index without referencing the GBi index value of the selected affine merge candidate.

According to a fifth GBi index inheritance configuration in some examples, application of the GBi index inheritance can be limited to reference blocks within the current CTU. In some embodiments, GBi index information can only be stored for the blocks within the current CTU. When using spatial MV prediction, if the predictor is from a block outside the current CTU, the GBi index information for the reference block may not have been saved for the reference block. Accordingly, the GBi index of the current block can be set to a default GBi index, which corresponds to the weight of ½ in some examples.

In one embodiment, the above limitation according to the fifth GBi index inheritance configuration can only apply to spatial inter merge for translational motion information.

In another embodiment, the above limitation according to the fifth GBi index inheritance configuration can only apply to inherited affine merge candidates.

In another embodiment, the above limitation according to the fifth GBi index inheritance configuration can only apply to both spatial inter merge for translational motion information, as well as for inherited affine merge candidates.

According to a sixth GBi index inheritance configuration in some examples, the usage of negative weights as indicated by a GBi index may be constrained such that negative weights can be used only if the two reference pictures used for a block belong to a same picture. According to the sixth GBi index inheritance configuration in some examples, the usage of positive weights as indicated by a GBi index may be constrained such that positive weights can be used only if the two reference pictures used for a block belong to different pictures. In some examples, according to the sixth GBi index inheritance configuration, the coding efficiency can be improved in some cases.

In some examples, pictures with the same picture order count (POC) values are determined as the same picture. In some examples, the signaling of the GBi information and the reference picture for the current block can be adjusted according to the constraints above.

According to a seventh GBi index inheritance configuration in some examples, the GBi index inheritance can be enabled for current picture referencing (CPR).

In VVC and VTM examples, under the CPR mode, a selected spatial merge candidate for a current block can be from the same picture as the current block. In some embodiments, the CPR implementation can only allow coding a block using uni-directional prediction. However, in other embodiments, the CPR implementation can allow coding a block using bi-directional prediction. If a current block is coded using bi-directional prediction with one reference block selected from the current picture, a GBi index can be used for the current block.

For example, in one embodiment, when the current block is coded in merge mode, and the selected merge candidate is bi-predicted with a GBi index, and both reference blocks are from the current picture (CPR mode), the current block's GBi index can be set to be the same as the candidate's GBi index. If the selected merge candidate is uni-predicted using CPR mode, the GBi index of the current block can be set to a default GBi index, which corresponds to the weight of ½ in some examples. In some embodiments, when the current block is a bi-predicted block referencing two different reference pictures, the GBi index of the current block can be set to the default GBi index, and no GBi index is signaled.

In some embodiments, a block is coded according to one of the bi-directional prediction and the uni-directional prediction with the current picture as a reference picture (CPR mode). In some examples, after obtaining prediction information of the block, when a motion information candidate is determined to be stored to the regular merge candidate list according to the prediction information of the block, the motion information candidate can be stored to include at least the motion information of the block and a weight parameter for performing bi-directional prediction for the first block when the first block is coded according to the bi-directional prediction. Also, the motion information candidate can be stored to include at least the motion information of the block and a default weight parameter when the block is coded according to the uni-directional prediction.

Figure 14:
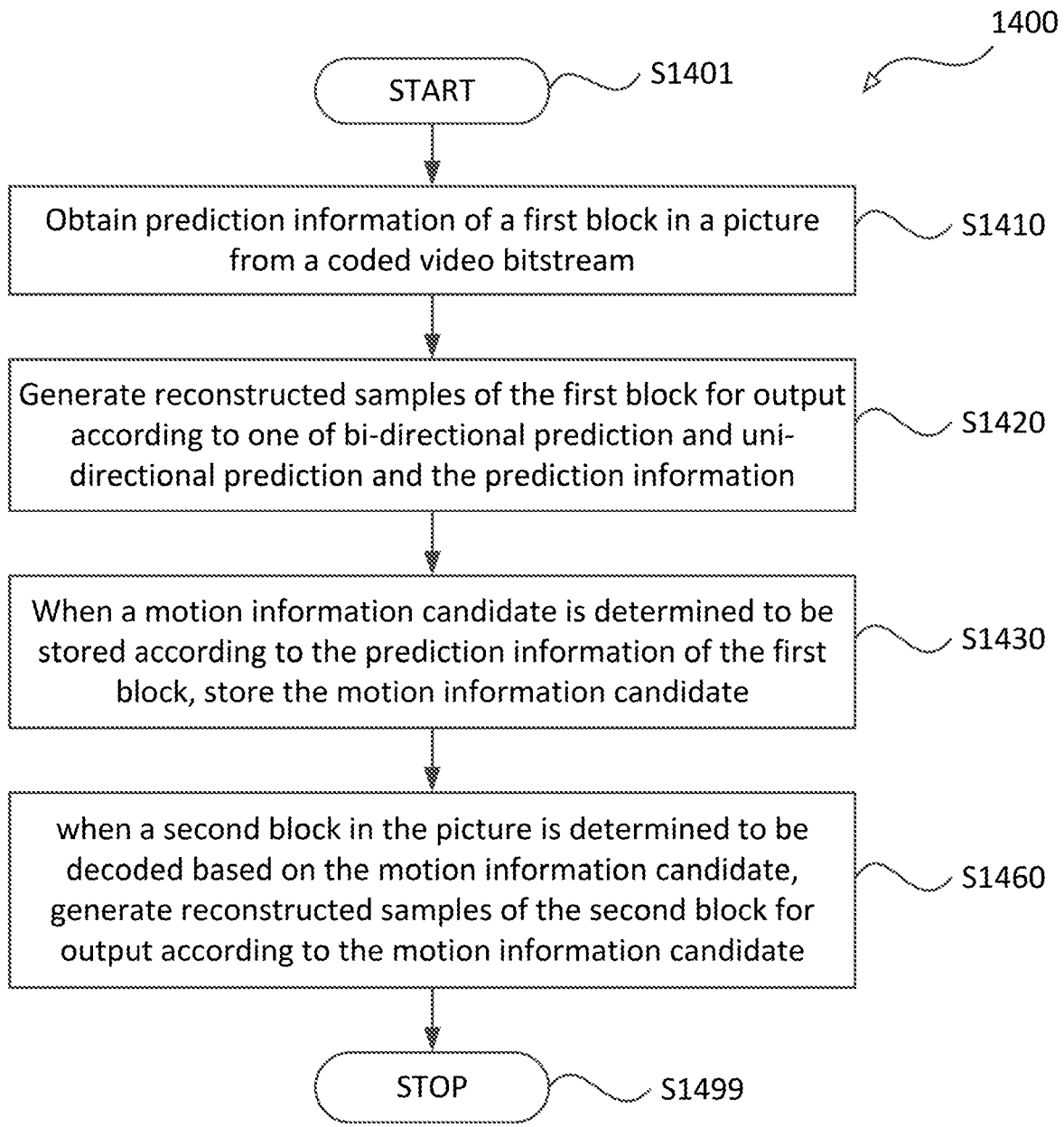
FIG. 14 shows a flow chart outlining a decoding process (1400) according to an embodiment of the disclosure.

FIG. 14 shows a flow chart outlining a decoding process (1400) according to an embodiment of the disclosure. The process (1400) can be used in constructing a list of motion information candidates for reconstructing a block (i.e., a current block) of a picture. In some embodiments, one or more operations are performed before or after process (1400), and some of the operations illustrated in FIG. 14 may be reordered or omitted.

In various embodiments, the process (1400) is executed by processing circuitry, such as the processing circuitry in the terminal devices (210), (220), (230), and (240), the processing circuitry that performs functions of the video decoder (310), (410), or (710), and the like. In some embodiments, the process (1400) is implemented by software instructions, thus when the processing circuitry executes the software instructions, the processing circuitry performs the process (1400). The process starts at (S1401) and proceeds to (S1410).

At (S1410), prediction information of a first block in a picture is obtained from a coded video bitstream. The prediction information indicates a mode for constructing a list of motion information candidates from one or more previously decoded blocks. In some embodiments, the mode for constructing the list of motion information candidates include various modes as described above, such as an HEVC merge mode, affine merge mode, sub-block based temporal MV prediction, history based MV prediction, pairwise averaged MV candidates, CPR, and/or other applicable processes or a combination thereof. In some examples, the prediction information can be obtained using the system or decoders illustrated in FIGS. 3, 4, and 7.

At (S1420), reconstructed samples of the first block are generated (e.g., for output) according to one of bi-directional prediction and uni-directional prediction and the prediction information. In some examples, the reconstructed samples of the first block can be generated using the system or decoders illustrated in FIGS. 3, 4, and 7.

At (S1430), when a motion information candidate is determined to be stored to a list of motion information candidates according to the prediction information of the first block, the motion information candidate can be stored.

In some embodiments, GBi index inheritance from HMVP merge candidates is enabled. Therefore, the motion information candidate can be stored as a HMVP candidate that includes at least the first motion information and the first weight parameter indicating a first weight for performing the bi-directional prediction for the first block when the first block is coded according to the bi-directional prediction. Also, the motion information candidate as a HMVP candidate can include the first motion information and a default weight parameter indicating a default weight when the first block is coded according to the uni-directional prediction. In some examples, the default weight is ½.

In some embodiments, GBi index inheritance can be enabled for CPR. Therefore, the motion information candidate can be stored to include at least the first motion information and the first weight parameter for performing the bi-directional prediction for the first block when the first block is coded according to the bi-directional prediction. Also, the motion information candidate can include the first motion information and the default weight parameter indicating the default weight when the first block is coded according to the uni-directional prediction.

In some embodiments, GBi index inheritance can be enabled for spatial inter merge candidate. The motion information candidate can be stored to include at least the first motion information and the first weight parameter for performing the bi-directional prediction for the first block when the first block is coded according to the bi-directional prediction. Also, the motion information candidate can include the first motion information and the default weight parameter indicating the default weight when the first block is coded according to the uni-directional prediction.

In some examples, the motion information candidate can be stored using the system or decoders illustrated in FIGS. 3, 4, and 7.

In some embodiments, the first block is coded using the bi-directional prediction based on a first reference picture in a first list (e.g., list 1) and a second reference picture in a second list (e.g., list 0), where a weight $w_1$ applicable to the first reference picture can be determined according to $$w_1 = \frac{w}{F}.$$

Also, a weight $w_0$ applicable to the second reference picture can be determined according to $$w_0 = 1 - w_1.$$

Here, w and F are integers, w represents a derived weight parameter (e.g., a weight indicated by the GBi index) to be included in the stored motion information candidate, and F represents a precision factor. In some examples, the precision factor F is 8.

In some examples, the reconstructed samples of the current block can be generated using the system or decoders illustrated in FIGS. 3, 4, and 7.

At (S1460), when a second block in the picture is determined to be decoded based on the motion information candidate, reconstructed samples of the second block can be generated for output according to the motion information candidate. In some examples, the reconstructed samples of the second block can be generated using the system or decoders illustrated in FIGS. 3, 4, and 7.

In some embodiments, at (S1460) when the motion information candidate is stored as a regular spatial merge candidate, and the second block is coded according to the bi-directional prediction, a second weight for performing the bi-directional prediction for the second block can be set according to the first weight parameter stored in the motion information candidate when the first block is spatially adjacent to the second block. Also, the second weight for performing the bi-directional prediction for the second block can be set to the default weight when the first block is not spatially adjacent to the second block.

In some embodiments, at (S1460) when the motion information candidate is stored as a candidate that is neither the regular spatial merge candidate nor the HMVP candidate, and the second block is coded according to the bi-directional prediction, the second weight for performing the bi-directional prediction for the second block can be to the default weight.

In some embodiments, when the first block is in a Coding Tree Unit (CTU) row different from that of a current CTU in which the second block is included, the motion information candidate is stored as a regular merge candidate or an affine merge candidate, and the second block is coded according to the bi-directional prediction, the second weight for performing the bi-directional prediction for the second block can be set to the default weight.

In some embodiments, when the first block is outside a current CTU in which the second block is included, the motion information candidate is stored as a translational merge candidate or an inherited affine merge candidate, and the second block is coded according to the bi-directional prediction, the second weight for performing the bi-directional prediction for the second block can be set to the default weight.

In some embodiments, the first block is coded according to the bi-directional prediction, and both of the first weight corresponding to a first reference picture in a first list and a second weight derived from the first weight and corresponding to a second reference picture in a second list are positive when the first and second reference pictures are a same reference picture.

In some embodiments, the first block is coded according to the bi-directional prediction, and one of the first weight corresponding to a first reference picture in a first list and a second weight derived from the first weight and corresponding to a second reference picture in a second list is negative when the first and second reference pictures are different reference pictures.

After (S1460), the process proceeds to (S1499) and terminates.

Figure 15:
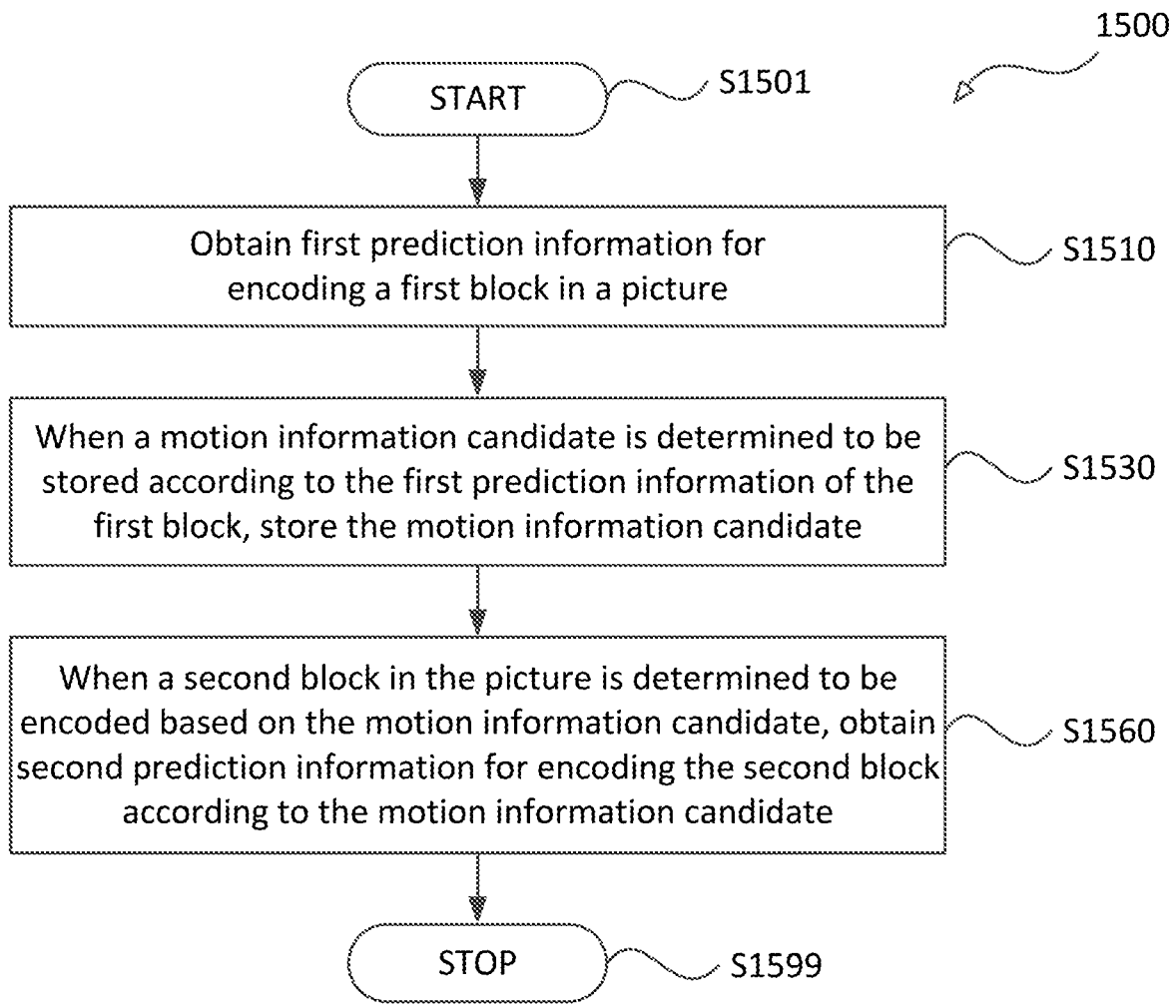
FIG. 15 shows a flow chart outlining an encoding process (1500) according to an embodiment of the disclosure.

FIG. 15 shows a flow chart outlining an encoding process (1500) according to an embodiment of the disclosure. The process (1500) can be used to encode a block (i.e., a current block) of a picture coded using inter mode. In some embodiments, one or more operations are performed before or after process (1500), and some of the operations illustrated in FIG. 15 may be reordered or omitted.

In various embodiments, the process (1500) is executed by processing circuitry, such as the processing circuitry in the terminal devices (210), (220), (230), and (240), the processing circuitry that performs functions of the video encoder (303), (503), or (603), and the like. In some embodiments, the process (1500) is implemented by software instructions, thus when the processing circuitry executes the software instructions, the processing circuitry performs the process (1500). The process starts at (S1501) and proceeds to (S1510).

At (S1510), first prediction information for encoding a first block in a picture is obtained. In some embodiments, the first prediction information can be obtained by any applicable motion estimation process for generating a suitable predictor for the first block. In some examples, the determination can be performed using the system or encoders illustrated in FIGS. 3, 5, and 6.

At (S1530), when a motion information candidate is determined to be stored to a list of motion information candidates according to the prediction information of the first block, the motion information candidate can be stored. In some examples, (S1530) can be performed in a manner similar to (S1430). In some examples, the determination of storing the motion information candidate can be performed using the system or encoders illustrated in FIGS. 3, 5, and 6.

At (S1560), when a second block in the picture is determined to be encoded based on the motion information candidate, second prediction information for encoding the second block can be obtained according to the motion information candidate. In some examples, (S1560) can include determining a weight for performing bi-directional prediction for the second block in a manner similar to (S1460). In some examples, the determination of the second prediction information can be performed using the system or encoders illustrated in FIGS. 3, 5, and 6.

After (S1560), the process proceeds to (S1599) and terminates

The techniques described above, can be implemented as computer software using computer-readable instructions and physically stored in one or more computer-readable media. For example, FIG. 16 shows a computer system (1600) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 16:
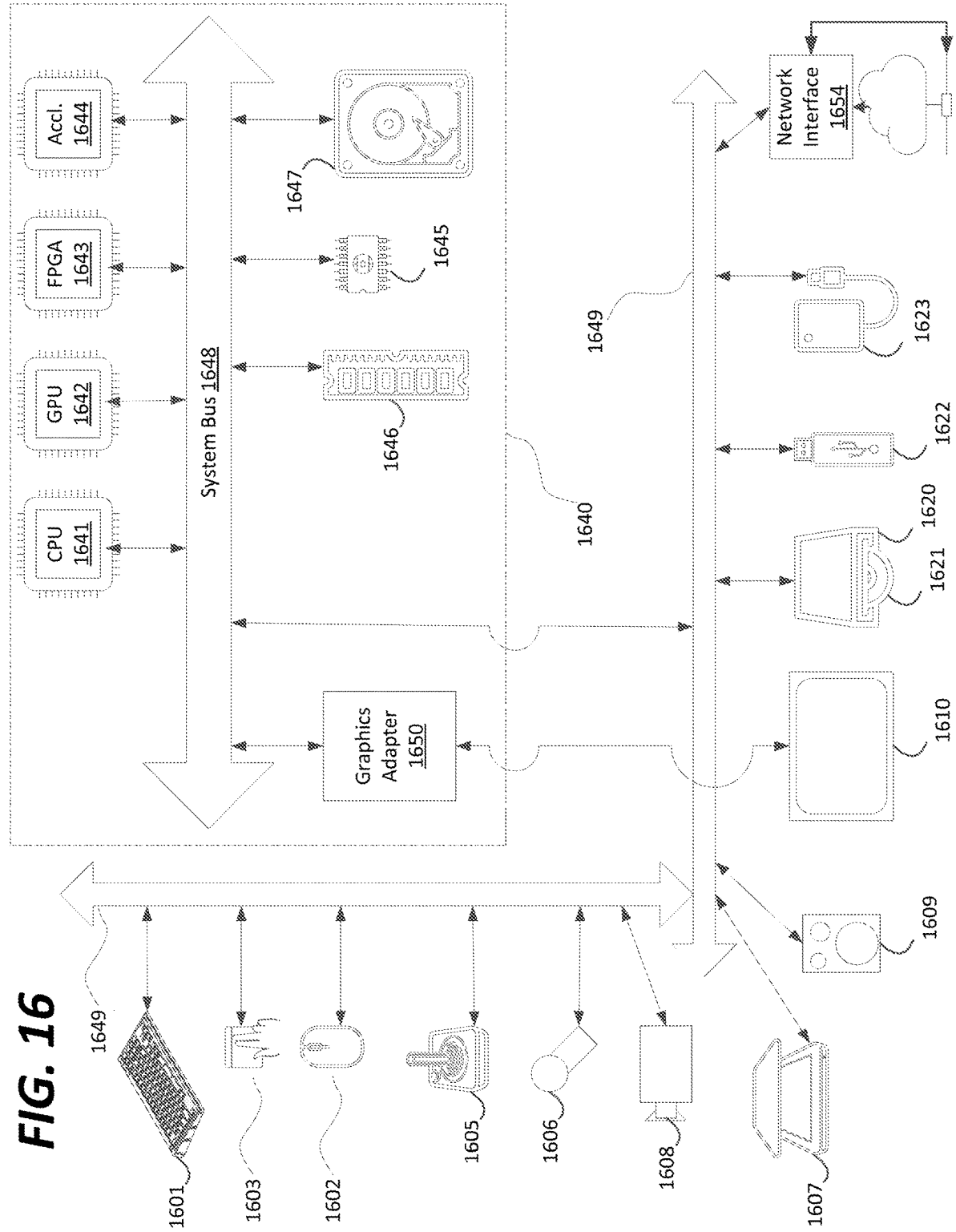
FIG. 16 is a schematic illustration of a computer system in accordance with an embodiment.

The components shown in FIG. 16 for computer system (1600) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1600).

Computer system (1600) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (1601), mouse (1602), trackpad (1603), touch screen (1610), data-glove (not shown), joystick (1605), microphone (1606), scanner (1607), camera (1608).

Computer system (1600) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1610), data-glove (not shown), or joystick (1605), but there can also be tactile feedback devices that do not serve as input devices), audio output devices (such as: speakers (1609), headphones (not depicted)), visual output devices (such as screens (1610) to include CRT screens, LCD screens, plasma screens, OLED screens, each with or without touch-screen input capability, each with or without tactile feedback capability—some of which may be capable to output two dimensional visual output or more than three dimensional output through means such as stereographic output; virtual-reality glasses (not depicted), holographic displays and smoke tanks (not depicted)), and printers (not depicted).

Computer system (1600) can also include human accessible storage devices and their associated media such as optical media including CD/DVD ROM/RW (1620) with CD/DVD or the like media (1621), thumb-drive (1622), removable hard drive or solid state drive (1623), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1600) can also include an interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (1649) (such as, for example USB ports of the computer system (1600)); others are commonly integrated into the core of the computer system (1600) by attachment to a system bus as described below (for example Ethernet interface into a PC computer system or cellular network interface into a smartphone computer system). Using any of these networks, computer system (1600) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (1640) of the computer system (1600).

The core (1640) can include one or more Central Processing Units (CPU) (1641), Graphics Processing Units (GPU) (1642), specialized programmable processing units in the form of Field Programmable Gate Areas (FPGA) (1643), hardware accelerators for certain tasks (1644), and so forth. These devices, along with Read-only memory (ROM) (1645), Random-access memory (1646), internal mass storage such as internal non-user accessible hard drives, SSDs, and the like (1647), may be connected through a system bus (1648). In some computer systems, the system bus (1648) can be accessible in the form of one or more physical plugs to enable extensions by additional CPUs, GPU, and the like. The peripheral devices can be attached either directly to the core's system bus (1648), or through a peripheral bus (1649). Architectures for a peripheral bus include PCI, USB, and the like.

CPUs (1641), GPUs (1642), FPGAs (1643), and accelerators (1644) can execute certain instructions that, in combination, can make up the aforementioned computer code. That computer code can be stored in ROM (1645) or RAM (1646). Transitional data can be also be stored in RAM (1646), whereas permanent data can be stored for example, in the internal mass storage (1647). Fast storage and retrieve to any of the memory devices can be enabled through the use of cache memory, that can be closely associated with one or more CPU (1641), GPU (1642), mass storage (1647), ROM (1645), RAM (1646), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture (1600), and specifically the core (1640) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (1640) that are of non-transitory nature, such as core-internal mass storage (1647) or ROM (1645). The software implementing various embodiments of the present disclosure can be stored in such devices and executed by core (1640). A computer-readable medium can include one or more memory devices or chips, according to particular needs. The software can cause the core (1640) and specifically the processors therein (including CPU, GPU, FPGA, and the like) to execute particular processes or particular parts of particular processes described herein, including defining data structures stored in RAM (1646) and modifying such data structures according to the processes defined by the software. In addition or as an alternative, the computer system can provide functionality as a result of logic hardwired or otherwise embodied in a circuit (for example: accelerator (1644)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit
SDR: standard dynamic range
HDR: high dynamic range
VTM: VVC Test Mode
CPMV: Control point motion vector
CPMVP: Control point motion vector predictor
MVP: Motion Vector Prediction
AMVP: Advanced Motion Vector Prediction
ATMVP: Advanced Temporal Motion Vector Prediction
HMVP: History-based Motion Vector Prediction
STMVP: Spatial-temporal Motion Vector Prediction
TMVP: Temporal Motion Vector Prediction
SbTMVP: subblock-based temporal motion vector prediction GBi: Generalized Bi-prediction
HEVC SCC: HEVC screen content coding
CPR: Current Picture Referencing
AMVR: Adaptive motion vector resolution
SPS: sequence parameter set
RD: Rate-Distortion While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for video decoding in a decoder, the method comprising:
   obtaining prediction information of a first block in a picture from a coded video bitstream;
   generating reconstructed samples of the first block according to the prediction information;
   adding motion information and a first bi-prediction weight index of a History-based Motion Vector Prediction (HMVP) candidate to an HMVP list, the first bi-prediction weight index indicating bi-prediction weights for the first block including a first weight applied to a first reference picture in a first list and a second weight applied to a second reference picture in a second list;
   generating reconstructed samples of a second block in the picture based on a plurality of candidates that includes the HMVP candidate;
   when the first block is in a Coding Tree Unit (CTU) row different from that of a current CTU in which the second block is included, the second block in the picture is decoded based on another motion information stored in a regular merge candidate or an affine merge candidate, and the second block is coded according to bi-directional prediction, setting a second bi-prediction weight index for the second block to the first bi-prediction weight index, and
   wherein, when the first block is decoded according to uni-directional prediction, the first bi-prediction weight index of the HMVP candidate added to the HMVP list indicates that the first weight and the second weight are equal.

2. The method of claim 1, further comprising:
   when the second block in the picture is decoded based on another motion information of a candidate of the plurality of candidates that is neither a regular spatial merge candidate nor from the HMVP list, and the second block is coded according to the bi-directional prediction,
   setting the second bi-prediction weight index for the second block to the first bi-prediction weight index.

3. The method of claim 1, further comprising:
   when the first block is outside a current CTU in which the second block is included, the second block in the picture is decoded based on another motion information stored in a translational merge candidate or an inherited affine merge candidate, and the second block is coded according to the bi-directional prediction,
   setting the second bi-prediction weight index for the second block to the first bi-prediction weight index.

4. The method of claim 1, wherein
   the first block is coded according to one of bi-directional prediction and uni-directional
   prediction with the picture as a reference picture.

5. The method of claim 1, wherein
   the first block is coded according to the bi-directional prediction, and
   both of the first weight applicable to the first reference picture in the first list and the second weight applicable to the second reference picture in the second list are positive when the first and second reference pictures correspond to different reference pictures.

6. The method of claim 1, wherein
   the first block is coded according to the bi-directional prediction, and
   one of the first weight applicable to the first reference picture in the first list and the second weight applicable to the second reference picture in the second list is negative when the first and second reference pictures correspond to a same reference picture.

7. The method of claim 1, wherein
   the bi-prediction weights are used for performing the bi-directional prediction for the first block and are determined according to a weight parameter indicated by the first bi-prediction weight index of the HMVP candidate and a precision factor F, and
   the precision factor F is 8.

8. A video encoder, comprising:
   processing circuitry configured to:
   obtain prediction information of a first block in a picture from a video;
   generate reconstructed samples of the first block according to the prediction information;
   add motion information and a first bi-prediction weight index of a History-based Motion Vector Prediction (HMVP) candidate to an HMVP list, the first bi-prediction weight index indicating bi-prediction weights for the first block including a first weight applied to a first reference picture in a first list and a second weight applied to a second reference picture in a second list;
   generate reconstructed samples of a second block in the picture based on a plurality of candidates that includes the HMVP candidate;
   when the first block is in a Coding Tree Unit (CTU) row different from that of a current CTU in which the second block is included, the second block in the picture is encoded based on another motion information stored in a regular merge candidate or an affine merge candidate, and the second block is encoded according to bi-directional prediction with the first bi-prediction weight index as a second bi-prediction weight index for the second block, and
   wherein when the first block is encoded according to uni-directional prediction, the first bi-prediction weight index of the HMVP candidate added to the HMVP list indicates that the first weight and the second weight are equal.

9. The video encoder of claim 8, wherein the processing circuitry is further configured to:
   when the second block in the picture is encoded based on another motion information of a candidate of the plurality of candidates that is neither a regular spatial merge candidate nor from the HMVP list, and the second block is encoded according to the bi-directional prediction,
   set the second bi-prediction weight index for the second block to the first bi-prediction weight index.

10. The video encoder of claim 8, wherein the processing circuitry is further configured to:

when the first block is outside a current CTU in which the second block is included, the second block in the picture is encoded based on another motion information stored in a translational merge candidate or an inherited affine merge candidate, and the second block is encoded according to the bi-directional prediction, set the second bi-prediction weight index for the second block to the first bi-prediction weight index.

11. The video encoder of claim 8, wherein the bi-prediction weights are used for performing the bi-directional prediction for the first block are determined according to a weight parameter indicated by the first bi-prediction weight index of the HMVP candidate and a precision factor F, and the precision factor F is 8.

12. A method of processing visual media data, the method comprising:

processing a bitstream that includes the visual media data according to a format rule, wherein the bitstream includes coding information of a first block and a second block in a picture, the format rule specifies that:

after decoding the first block, motion information and a first bi-prediction weight index of the first block are added as a History-based Motion Vector Prediction (HMVP) candidate to an HMVP list, the first bi-prediction weight index of the HMVP candidate indicating bi-prediction weights for the first block including a first weight applied to a first reference picture in a first list and a second weight applied to a second reference picture in a second list, the second block is decoded based on a plurality of candidates that includes the HMVP candidate, when the first block is in a Coding Tree Unit (CTU) row different from that of a current CTU in which the second block is included, the second block in the picture is decoded based on another motion information stored in a regular merge candidate or an affine merge candidate, and the second block is coded according to bi-directional prediction, a second bi-prediction weight index for the second block is set to the first bi-prediction weight index, and when the first block is decoded according to uni-directional prediction, the first bi-prediction weight index of the HMVP candidate is added to the HMVP list indicates that the first weight and the second weight are equal.

* * * * *